(12) United States Patent
Voorhies et al.

(10) Patent No.: US 10,725,462 B2
(45) Date of Patent: Jul. 28, 2020

(54) OPTIMIZING ROBOTIC MOVEMENTS BASED ON AN AUTONOMOUS COORDINATION OF RESOURCES AMONGST ROBOTS

(71) Applicant: inVia Robotics, Inc., Agoura Hills, CA (US)

(72) Inventors: Randolph Charles Voorhies, Culver City, CA (US); Lior Elazary, Agoura Hills, CA (US); Daniel Frank Parks, II, Los Angeles, CA (US)

(73) Assignee: inVia Robotics, Inc., Westlake Village, CA (US)

( * ) Notice: Subject to any disclaimer, the term of this patent is extended or adjusted under 35 U.S.C. 154(b) by 309 days.

(21) Appl. No.: 15/945,445

(22) Filed: Apr. 4, 2018

(65) Prior Publication Data
US 2018/0239343 A1    Aug. 23, 2018

Related U.S. Application Data

(63) Continuation-in-part of application No. 15/369,435, filed on Dec. 5, 2016, now Pat. No. 10,324,455.
(Continued)

(51) Int. Cl.
G05B 19/418 (2006.01)
G05D 1/02 (2020.01)
G05D 1/00 (2006.01)

(52) U.S. Cl.
CPC . *G05B 19/41895* (2013.01); *G05B 19/41865* (2013.01); *G05D 1/0027* (2013.01);
(Continued)

(58) Field of Classification Search
CPC .......... G05B 19/4061; G05B 19/41815; G05B 19/41865; G05B 19/41895;
(Continued)

(56) References Cited

U.S. PATENT DOCUMENTS

| 5,720,454 A | 2/1998 | Bachetti et al. |
| 9,513,627 B1 * | 12/2016 | Elazary ............ G05B 19/41865 |

(Continued)

*Primary Examiner* — Spencer D Patton
(74) *Attorney, Agent, or Firm* — Ansari Katiraei LLP; Arman Katiraei; Sadiq Ansari

(57) ABSTRACT

A synchronization primitive provides robots with locks, monitors, semaphores, or other mechanisms for reserving temporary access to a shared limited set of resources required by the robots in performing different tasks. Through non-conflicting establishment of the synchronization primitives across the set of resources, robots can prioritize the order with which assigned tasks are completed and minimize wait times for resources needed to complete each of the assigned tasks, thereby maximizing the number of tasks simultaneously executed by the robots and optimizing task completion. The synchronization primitives and resulting resource allocation can be implemented with a centralized coordinator or with peer-to-peer robotic messaging, whereby private keys and blockchains secure the precedence and establishment of synchronization primitives by different robots. Moreover, synchronization primitives can be established with queues to further optimize the immediate and future allocation of resources to different robots.

16 Claims, 14 Drawing Sheets

Related U.S. Application Data which is a continuation of application No. 15/137,463, filed on Apr. 25, 2016, now Pat. No. 9,513,627.

(52) U.S. Cl.
CPC ......... G05D 1/0234 (2013.01); G05D 1/0289 (2013.01); G05D 1/0297 (2013.01); *G05B 2219/39146* (2013.01); *G05B 2219/39167* (2013.01); *G05D 2201/0216* (2013.01); *Y02P 90/02* (2015.11)

(58) Field of Classification Search
CPC ........... G05B 2219/39146; G05B 2219/39166; G05B 2219/39167; G05B 2219/39169; G05D 2201/0216; G05D 2201/0209; G05D 2201/0212; G05D 2201/0213; G05D 1/0027; G05D 1/0276; G05D 1/0287; G05D 1/0289; G08G 1/16; G08G 1/161; G08G 1/164; G08G 1/20
See application file for complete search history.

(56) References Cited

U.S. PATENT DOCUMENTS

| | | |
|---|---|---|
| 2007/0219681 A1 | 9/2007 | Kumar et al. |
| 2007/0293978 A1* | 12/2007 | Wurman ............ G05B 19/4189 700/213 |
| 2010/0316470 A1 | 12/2010 | Lert et al. |
| 2014/0350831 A1 | 11/2014 | Hoffman et al. |
| 2015/0319668 A1 | 11/2015 | Guo |

* cited by examiner

T(1520) = 50s [32s(Ttotal)+18s(Ctotal)]
T(1530) = 45s [34s(Ttotal)+11s(Ctotal)]
Optimal path -> T(1540) = 37s [33s(Ttotal)+4s(Ctotal)]

T(1520) = 50s [32s(Ttotal)+18s(Ctotal)]
Optimal path -> T(1530) = 45s [34s(Ttotal)+11s(Ctotal)]
T(1540) = 46.5s [33s(Ttotal)+4s(Ctotal)+.75*10s(P1total)+.25*8s(P2total)]

OPTIMIZING ROBOTIC MOVEMENTS BASED ON AN AUTONOMOUS COORDINATION OF RESOURCES AMONGST ROBOTS

CLAIM OF BENEFIT TO RELATED APPLICATIONS

This application is a continuation-in-part of U.S. nonprovisional application Ser. No. 15/369,435 entitled "Autonomous Coordination of Resource Amongst Robots", filed Dec. 5, 2016 which is a continuation of U.S. nonprovisional application Ser. No. 15/137,463 entitled "Autonomous Coordination of Resource Amongst Robots", filed Apr. 25, 2016, now U.S. Pat. No. 9,513,627. The contents of applications Ser. Nos. 15/369,435 and 15/137,463 are hereby incorporated by reference.

BACKGROUND INFORMATION

Collision detection and avoidance has expanded robot autonomy by allowing robots to move in three dimensional space. Robots can detect and avoid obstacles in their path while also finding and interacting with items of interest. The expanded autonomy has increased the functionality and roles of robots. One such example is the use of robots to navigate within a warehouse in order to retrieve items distributed throughout the warehouse.

Collision detection and avoidance is a form of local navigation. Robots independently identify obstacles and independently perform actions to avoid the obstacles. Such local navigational techniques are sufficient for robots navigating in a space with stationary obstacles. Inefficiencies and even deadlocks can arise however when local navigational techniques fully control robot movements in a space with transitory obstacles. In particular, inefficiencies and deadlocks can be seen when the local navigational techniques fully control movements of several robots operating in the same space. The inefficiencies and deadlocks stem from the lack of coordinated movement between the robots and the inability of the robots to communicate in order to establish movement precedence. For example, a first robot locally navigating away from a collision can create a ripple effect whereby the first robot moves into the path of a second robot, creating one or more new collisions that both the first and second robots attempt to avoid, which in turn cascades the effect and creates additional obstacles with other robots.

Generally, the same issues arise whenever two or more robots require the same resource and the robots operate independently and autonomously. The sought after resource can include anything including tangible and intangible resources. Tangible assets include physical items, locations (e.g., space, charging stations, etc.), and components. Intangible assets can include shared computing resources, shared communication channels, and time as some examples.

There is therefore a need to optimize access to limited resources for robots operating in the same space. The optimized access will allow the robots to move more efficiently within a common space as well as perform designated tasks more efficiently. In particular, the optimized access prioritizes the resource allocation to minimize aggregate time robots wait in order to obtain the resources needed to move or perform a task. To this end, there is a need to coordinate the resource allocation and reservation amongst robots. There is a further need to have the robots coordinate the resource allocation and reservation autonomously without human intervention so that the resources can be efficiently allocated in real-time. Accordingly, there is a need to supplement local navigational techniques with global navigational techniques and independent and autonomous robot operation through coordinated resource allocation.

BRIEF DESCRIPTION OF THE DRAWINGS

A preferred embodiment for autonomous coordination of resources amongst robots will now be described, by way of example only, with reference to the accompanying drawings in which.

DETAILED DESCRIPTION OF PREFERRED EMBODIMENTS

Figure 1:
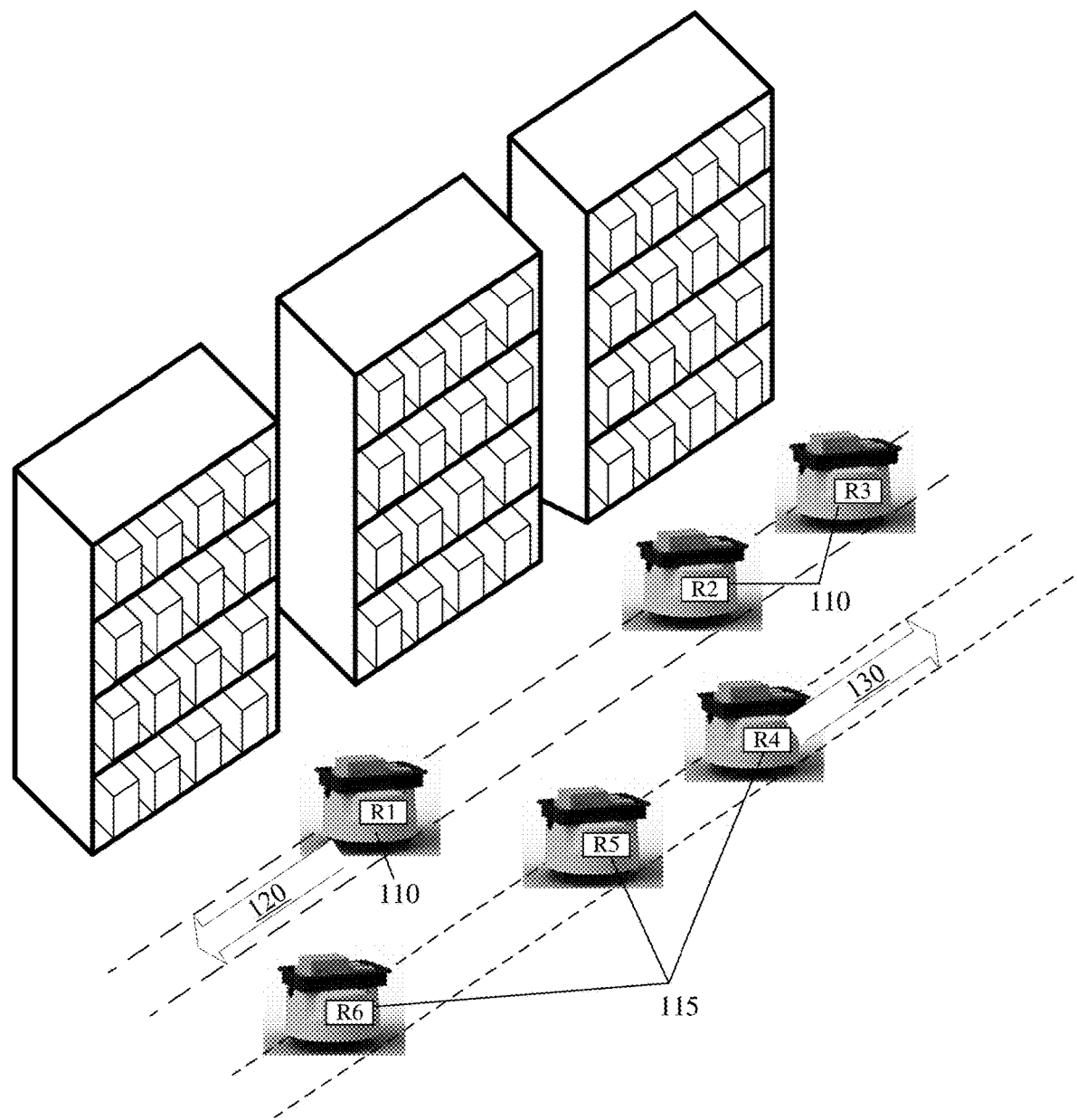
FIG. 1 conceptually illustrates the modified robot operation resulting in the autonomous coordinated movement of multiple robots in accordance with some embodiments.

In the following detailed description, numerous details, examples, and embodiments are set forth and described. As one skilled in the art would understand in light of the present description, the system and methods are not limited to the embodiments set forth, and the system and methods may be practiced without some of the specific details and examples discussed. Also, reference is made to accompanying figures, which illustrate specific embodiments in which autonomous coordination of resources amongst robots can be practiced. It is to be understood that other embodiments can be used and structural changes can be made without departing from the scope of the embodiments herein described.

The embodiments provide synchronization primitives with which independently and autonomously operated robots coordinate and control access to a limited set of shared resources required by the robots in performing different tasks. The shared resources are available for use by all robots and the synchronization primitives allow the robots to temporality reserve different resources for exclusive and guaranteed, immediate or future access to those resources. Using the synchronization primitives, robots prioritize the order with which assigned tasks are completed and minimize wait times for resources needed to complete each of the assigned tasks, thereby maximizing the number of tasks simultaneously executed by the robots and optimizing task completion.

In some embodiments, the synchronization primitive is a lock, monitor, semaphore, or other mechanism for reserving temporary access to a resource. The synchronization primitive enables atomic transactions and guarantees that no two entities have access to the resource at the same time.

Some embodiments establish a resource queue in which synchronization primitives from different robots can be entered for ordered or future reservation of a corresponding resource. In other words, the synchronization primitive can be issued with respect to a particular resource with a time, wherein the time specifies the reservation duration or future time for reserving the resource.

The synchronization primitive provides notification regarding resource availability. For instance, when a first robot attempts to reserve a resource already reserved by a second robot, the first robot will identify the synchronization primitive of the second robot already associated with the resource.

The synchronization primitive is resource agnostic. Robots can use the synchronization primitive to coordinate control and access to any number of different tangible and intangible resources in real-time including three dimensional space, computational resources, and authentication privileges as some examples.

Some embodiments modify robot operation to form lanes and to leverage the synchronization primitive for coordinating and controlling movements relative to other robots while moving within the lanes. Coordinating and controlling the movement of robots with the lanes and synchronization primitives of some embodiments eliminates the potential for deadlock, minimizes the number of robot-to-robot collisions, and further minimizes the number of navigational adjustments robots make in moving from one location to another. In this manner, the embodiments enable multiple robots to move more efficiently within the same space.

FIG. 1 conceptually illustrates the modified robot operation resulting in the autonomous coordinated movement of multiple robots in accordance with some embodiments. The figure depicts multiple robots 110 and 115 operating within a common space. In this figure, the common space includes an aisle formed by a series of shelves that contain different items.

As noted above, the modified robot operation coordinates the movement of different robots 110 and 115 in the same space using different lanes 120 and 130. In particular, robots 110 traveling in a first direction down the aisle stay in a first lane 120, while robots 115 traveling in an opposite second direction up the aisle stay in a different second lane 130. The lanes 120 and 130 keep the robots 110 and 115 traveling in opposite directions from colliding or otherwise coming into contact with one another. The lanes 120 and 130 and modified robot operation to use the lanes are part of an overall global navigational methodology for autonomously coordinating the movement of multiple robots operating within the same space.

There are however instances where robots stop their movement and are temporarily stationary within a given lane. A first scenario is when a robot in the closer first lane retrieves an item from a shelf. The robot stops in the lane in order to locate and retrieve the item from the shelf. A second scenario is when a robot wishes to change directions or change lanes. These and other stoppage scenarios have the potential of creating collision or deadlock between two or more robots moving to or past the same space.

To prevent these collisions, some embodiments further coordinate the movement of the different robots with the synchronization primitives. The synchronization primitives allow robots to reserve different portions of three dimensional space to ensure unconflicted entry into that space. This three dimensional space reservation creates a movement precedence between two or more robots. The movement precedence provides a first robot that successfully reserves conflicted space with a synchronization primitive priority to enter that conflicted space, and causes at least a second robot that was unable to reserve the conflicted space to defer to the first robot until the first robot has moved through the conflicted space and subsequently released the synchronization primitive reserving the conflicted space.

Some embodiments modify robot operation so that each robot uses synchronization primitives to reserve space in front, behind, and to its side when moving or coming to a stop. The synchronization primitives prevent entry of other robots into the reserved space and further prevent the reserving robot from being deadlocked in the entered space.

If a robot is unable to reserve space with a synchronization primitive, the robot is prevented from moving into that space. The robot can either temporarily pause its movement or navigate around synchronization primitives established by other robots. In some embodiments, navigating around a synchronization primitive involves a robot temporarily entering a third lane to move past the reserved resource before reentering the first lane or the second lane in which the robot was previously in.

The synchronization primitives can be defined with a set of spatial coordinates when used to reserve space for current or future movements. These synchronization primitives can also be defined with other parameters. For example, a robot may define a time or duration for a synchronization primitive when establishing the synchronization primitive. The time or duration notifies other robots as to how long the synchronization primitive will exist.

Figure 2:
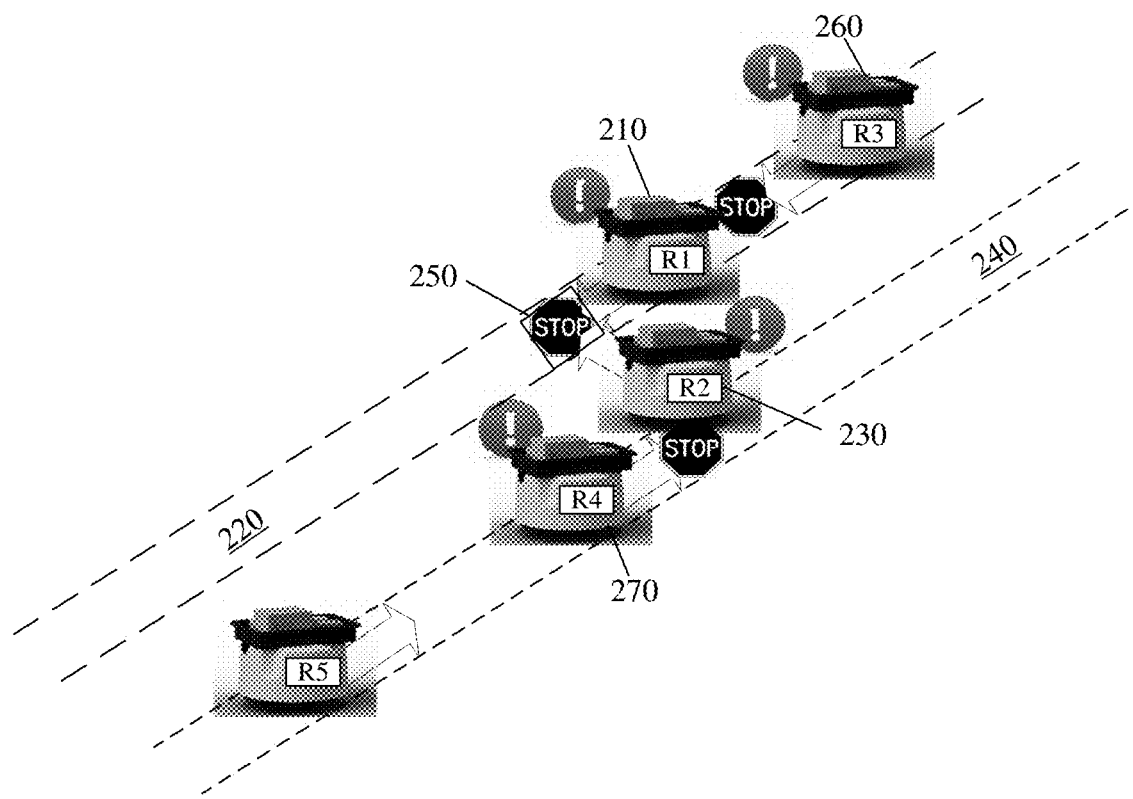
FIG. 2 conceptually illustrates a deadlock that is formed between two robots moving without the use of the synchronization primitives of some embodiments.

As noted above, the movement precedence established by the synchronization primitives enhances the coordinated movements of robots in lanes by preventing collisions and deadlocks. FIG. 2 conceptually illustrates a deadlock that is formed between two robots moving without the use of the synchronization primitives of some embodiments, and FIG. 3 illustrates using the synchronization primitives to prevent the deadlock from forming in accordance with some embodiments.

In FIG. 2, a first robot 210 attempts to move in a first direction down a first lane 220 and a second robot 230 attempts to move from a second lane 240 into the first lane 220 directly in front of the first robot 210. Both robots 210 and 230 attempt to enter the conflicted space 250 and both robots 210 and 230 come to a stop to avoid colliding with one another. Without any coordination of movements, both robots 210 and 230 may wait for the other to move out of the way. Other robots 260 and 270 can then move in behind the first and second robots 210 and 230, blocking them in and creating a deadlock. Alternatively, the first and second robots 210 and 230 may try and find an alternate route to the conflicted space only to create potential collisions and deadlocks with the other robots.

Figure 3:
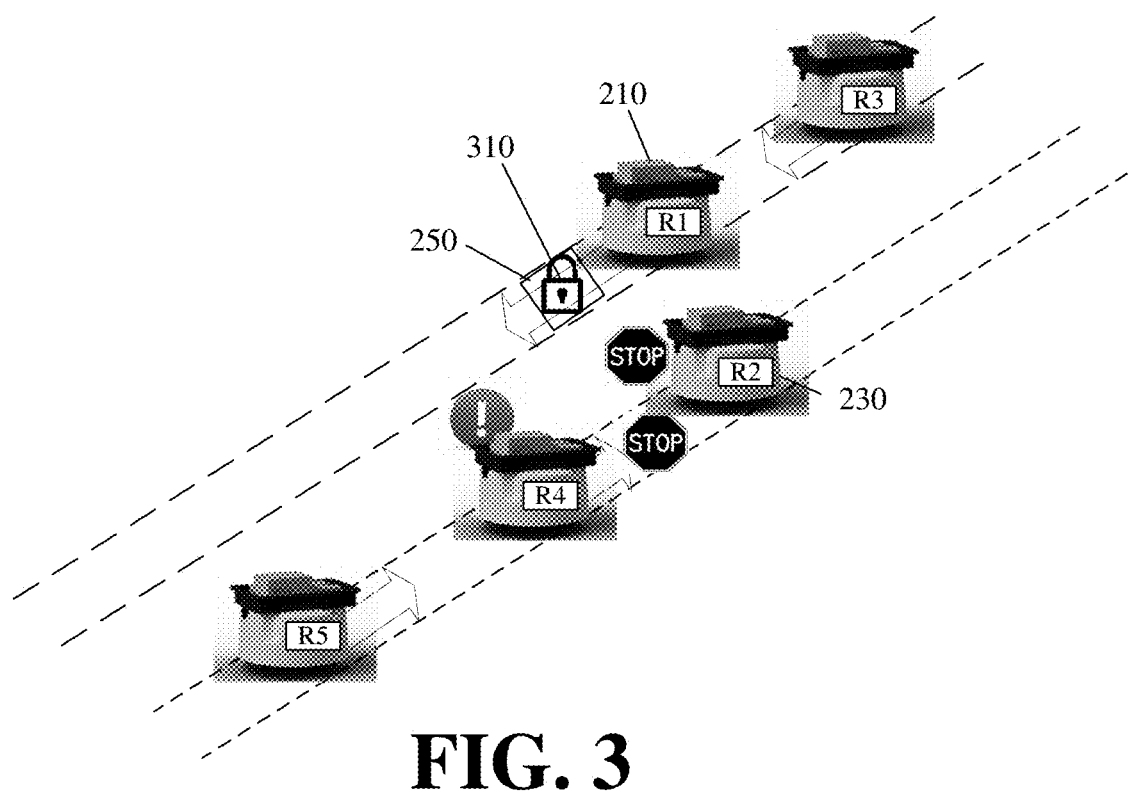
FIG. 3 illustrates using the synchronization primitives to prevent the deadlock from forming in accordance with some embodiments.

FIG. 3 resolves the conflict by using the synchronization primitive to reserve the space resource for one of the robots, with other robots deferring movement into the space resource until they are able to reserve the space resource in kind with a synchronization primitive of their own. The first robot 210 reserves the conflicted space with a synchronization primitive 310 and is provided precedence to move into the conflicted space 250. The second robot 230 cannot establish its own synchronization primitive to reserve the conflicted space 250, and must defer to the first robot 210 by waiting until the first robot 210 removes the synchronization primitive 310. The first robot 210 moves through the conflicted space 250, removes the synchronization primitive 310, thereby allowing the second robot 230 to reserve the space for itself before moving into it.

In some embodiments, the formation of the lanes results from modified robot operation that causes the robots to keep different set distances when travelling in different directions. This modified robot operation results from adapting robot sensors to detect distance and from adapting robot operation to modify its distance in accordance with the direction the robot intends to move.

The robots can use a variety of sensors to detect and correct the distance for an intended lane. Visual (e.g., light, laser, imaging, LiDAR, etc.), acoustic, global position system (GPS), or other beacon or signal based sensors can be used by the robots for the lane specific distance detection and correction.

Figure 4:
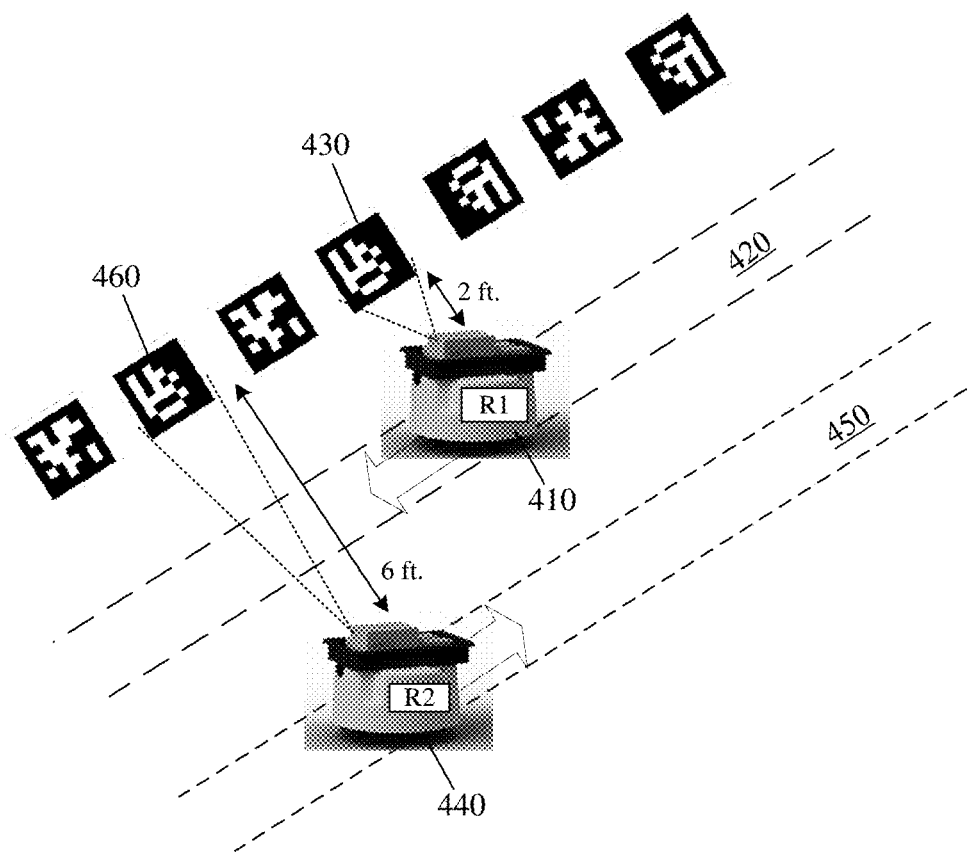
FIG. 4 illustrates the modified robot operation of some embodiments for keeping robots in at least first and second lanes.

FIG. 4 illustrates the modified robot operation of some embodiments for keeping robots in at least first and second lanes. The figure presents a first robot 410 operating in a first lane 420 because the first robot 410 maintains a first distance from a first reference point 430 that is about perpendicular to the first robot's 410 directional movement. The figure also presents a second robot 440 operating in a second lane 450 because the second robot 440 maintains a greater second distance from a second reference point 460 that is about perpendicular to the second robot's 440 direction movement.

Some embodiments place the references points about a common vertical plane to aid the robots in the recognizing the reference points. The common vertical plane provides the robots with a static location at which to position their cameras when moving down the lanes.

The reference points include one or more features with which a robot can gauge its distance relative to each reference point. The reference points can also be encoded with information that upon decoding conveys more than a point of reference. The encoded information can identify a nearby object, a location, a measure, size, and cost as some examples. With the encoded information, the reference points can serve a dual purpose in establishing the lanes and conveying location information to the robots. Using the location information embedded in the reference points, the robots can navigate within a space without global positioning system (GPS) or other positioning systems.

The reference points of FIG. 4 can be any robot recognizable object. The reference points can be parallel to the lanes or arbitrarily placed about the lanes. The reference points can be visual markers or signal emitting beacons. As such, the reference points need not be visually defined.

Marker defined reference points can be formed by unique arrangements of patterns, lines, shapes, and other symbols or visual identifiers. In some embodiments, the markers are fiducials. Fiducials of different resolutions can be used depending on the application.

Figure 5:
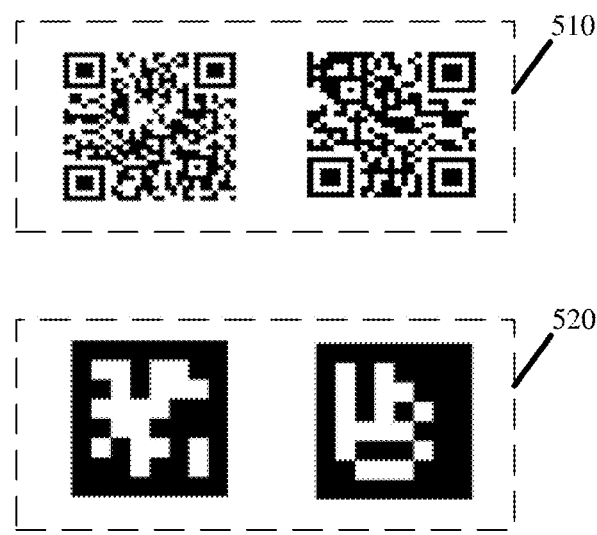
FIG. 5 presents an exemplary subset of high resolution markers and subset of low resolution markers in accordance with some embodiments.

High resolution fiducials, such as barcodes and Quick Response (QR) codes, comprise a more tightly condensed set of visual information than low resolution fiducials, such as April tags or April codes. Other fiducials that can be used as robotic navigational markers include ArUco markers and ARTag markers as some examples. FIG. 5 presents an exemplary subset of high resolution markers 510 and subset of low resolution markers 520 in accordance with some embodiments.

Lower resolution markers are preferred because robots can decipher the lower resolution markers in less time, with less visual accuracy, and from greater distances than high resolution markers. This is primarily due to the fewer number of features and larger size of each feature in the low resolution markers 520 relative to the high resolution markers 510. The larger size of the low resolution marker features also allows the robots to correct for any blurriness that enters into an image or scan of a low resolution marker via software without affecting the decoding thereof. Consequently, the robots can take less precise images of the low resolution markers 520, wherein the lower precision can be due to the robots being transitory or further away from the marker while taking the image. Stated differently, the robots are able to scan and decipher such markers without halting or otherwise interrupting their movement in any of the defined lanes. The ability for robots to scan the low resolution markers while transitory and from greater distance facilitates the usage of the same set of markers to establish a first lane in which robots move at a first distance from the markers and a second lane in which robots move at a larger second distance from the markers.

Figure 6:
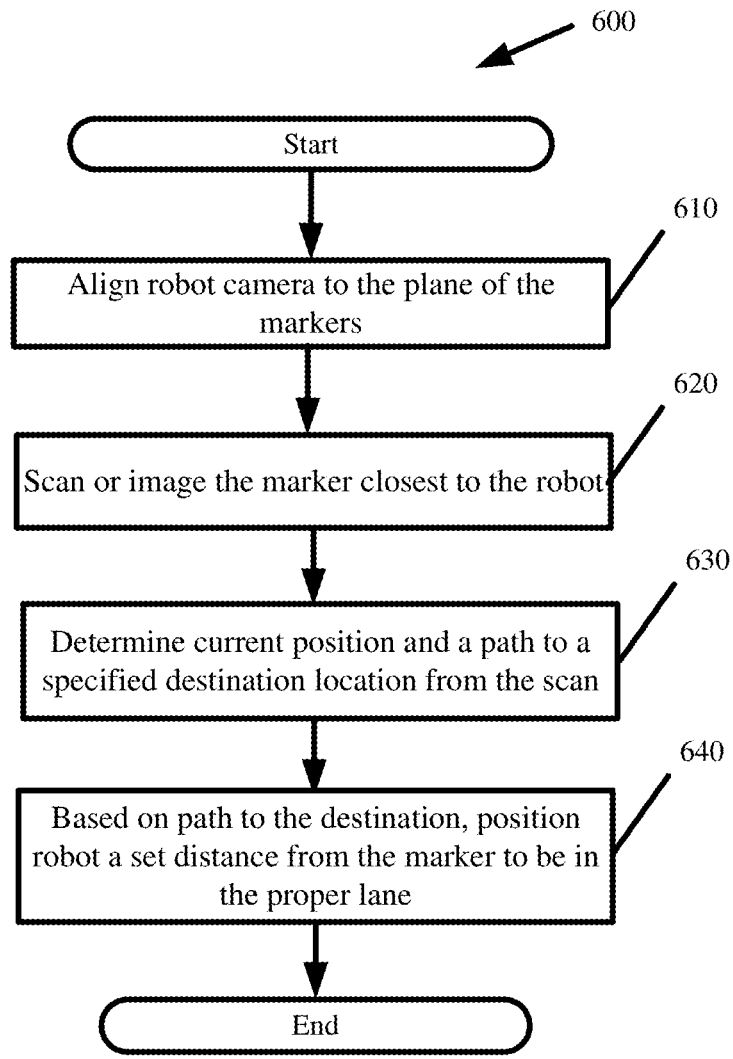
FIG. 6 presents a process detailing the modified robot operation of some embodiments for coordinating the movement of a robot in the different lanes using the markers.

FIG. 6 presents a process 600 detailing the modified robot operation of some embodiments for coordinating the movement of a robot in the different lanes using the markers. The process 600 commences after a robot receives an instruction to move to a destination location. The destination location can be specified with one or more markers or can be specified with a set of coordinates or other information that can be decoded from the markers in some embodiments.

The process starts by aligning (at 610) the robot's camera to the plane of the markers so that the markers fall within the camera's field of view. As noted above, the robot can be programmed with a specific height or plane at which to locate the markers. The robot can also use an internal compass to determine its position relative to the markers in order to determine what direction to turn the camera so that it faces the markers. For example, the markers may be to the right of the robot when the robot is facing a first direction and the markers may be to the left of the robot when the robot is facing an opposite second direction.

The process scans or images (at 620) the marker closest to the robot. In some embodiments, the robot scans the marker that is about perpendicular to the robot's current position or the direction in which the robot last moved.

The process determines (at 630) its current position and a path to the specified destination location from the scan. In some embodiments, the robot determines its current position from decoding location information from the adjacent marker. In some embodiments, the robot determines a path to the destination based on the location information decoded from the adjacent marker and the manner in which the location information changes in markers on either side of the adjacent marker. The robot can also be programmed with a map that generally identifies where its current position is relative to the intended destination with the robot then using the markers to specifically locate the destination.

The determined path identifies the direction the robot must move in order to reach the destination. The direction of movement determines what lane the robot must enter. Accordingly, the process next involves positioning (at 640) a set distance from the marker so that the robot enters the proper lane for moving in the direction of the destination. For instance, if moving in a first direction, the process positions the robot a first distance from the marker. If moving in an opposite second direction, the process positions the robot a second distance from the marker. The robot operation for moving within the lanes using the synchronization primitives is described below with reference to FIG. 8.

Figure 7:
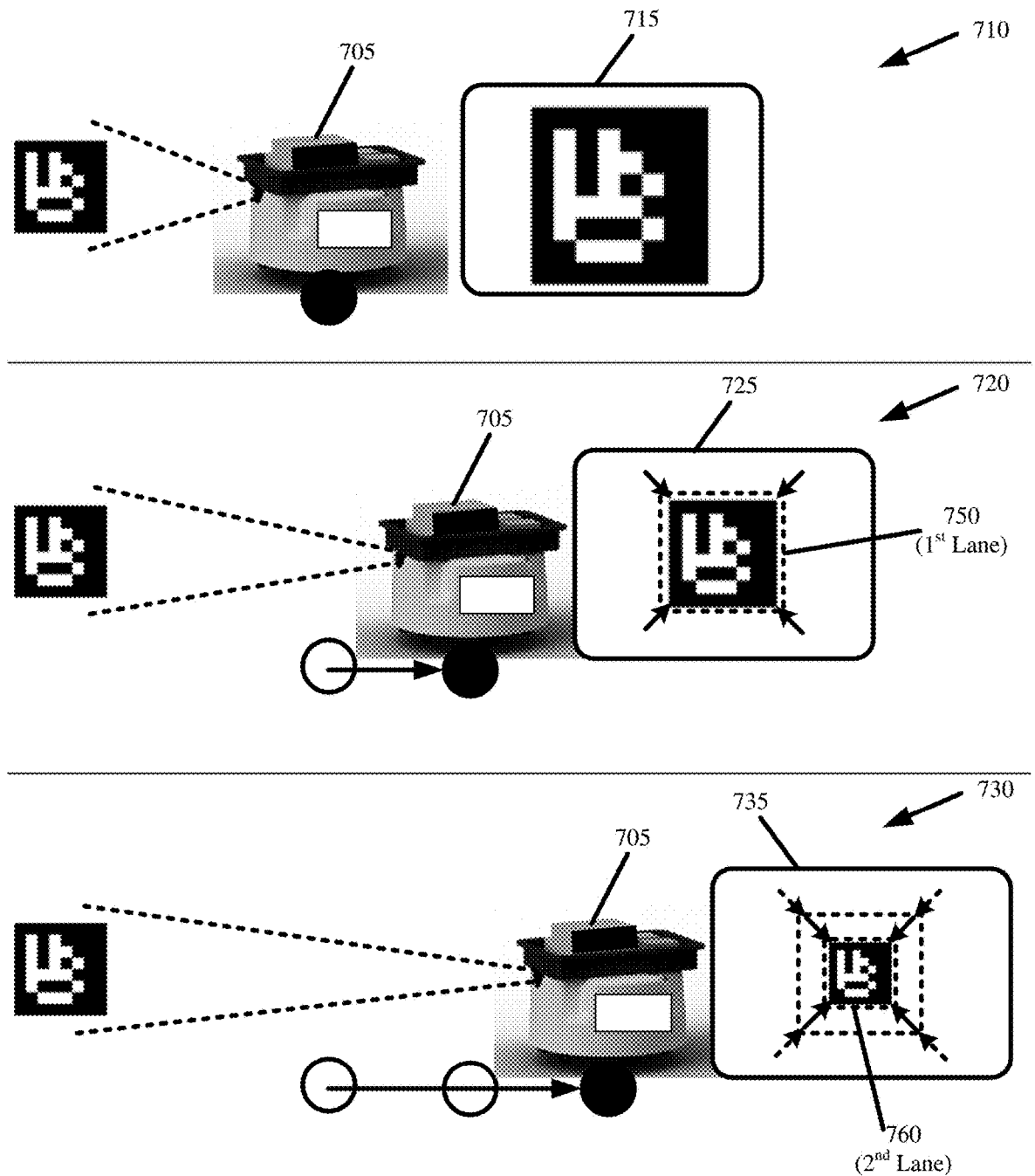
FIG. 7 conceptually illustrates the modified operation by which a robot positions itself in a correct lane based on the intended direction of robot movement.

FIG. 7 conceptually illustrates the modified operation by which a robot 705 positions itself in a correct lane based on the intended direction of robot movement. At stage 710, the figure illustrates the first imaging 715 of a marker that is closest to the robot 705. Based on the size of the marker and/or features of the marker appearing in the robot's 705 image, the robot 705 determines its distance relative to the marker.

At stage 720, the robot 705 performs a first set of positional adjustments 750 to move away from the marker. The robot takes and processes images of the marker while moving, and stops its movements when the marker or marker features marker appear in a second image 725 at a defined first size 750. When the marker or marker features appear at the defined first size 750 in the robot's camera, the robot is in the first lane.

At stage 730, the robot performs a second set of positional adjustments to move further away from the marker. The robot again takes and process images of the marker while moving and stops its movements when the marker or marker features appear in a third image 735 at a defined second size 760. When the marker or marker features appear at the defined second size 760 in the robot's camera, the robot is in the second lane.

In some embodiments, the robot determines its distance from the marker based on a transform computation of the marker image. In some embodiments, the robot determines its distance from the marker by comparing the appearance of the marker to a first reference image for the first lane and a second reference image for the second lane.

These same techniques can be applied to coordinate robot movements without reference to visual markers of any kind. In some embodiments, the robot's sensory array includes a depth perception camera or a range finding sensor. The robot turns this sensor to face a wall or other object running along the robot's intended movement path. The direction with which to turn the sensor may depend on the robot's intended movement direction. For instance, the robot may turn the sensor west when traveling north and turn the sensor east when traveling south. The robot can then adjust its distance and enter the correct lane based on the distance measurements obtained from the sensor. One or more light sensors, acoustic sensors, and other beacon or signal detection sensors can be used in the same manner to obtain distance measurements and enter the robot in a correct lane for movement within a site.

Although coordinating robot movement in the lanes includes modifying robot operation, it should be evident that no changes are needed to the robot's sensory array. Different sensors can be adapted to perform the global navigational methodology for autonomously coordinating the movement of multiple robots in different lanes.

Figure 8:
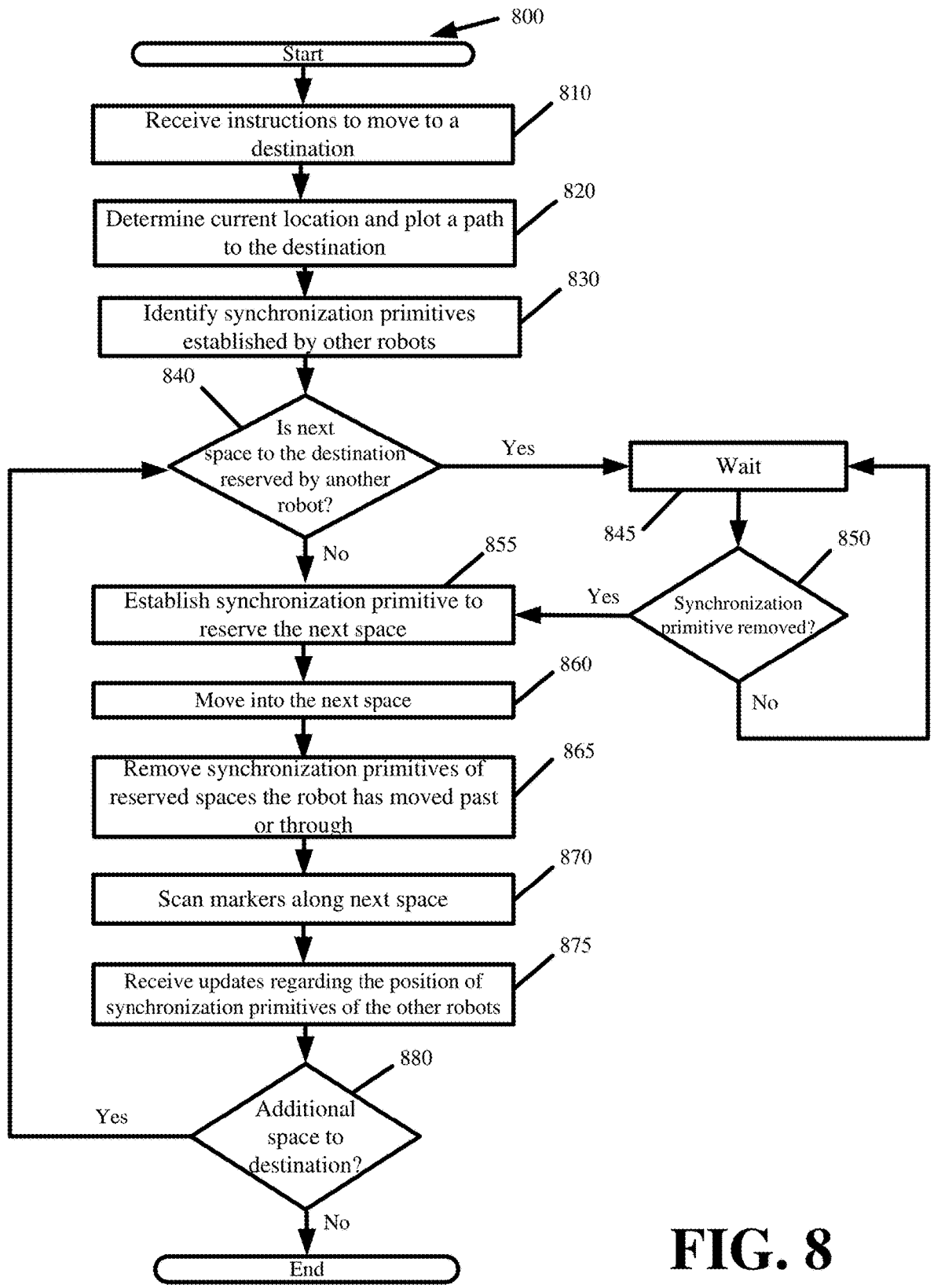
FIG. 8 presents a process detailing the modified robot operation of some embodiments for coordinating the movement of a robot with synchronization primitives.

FIG. 8 presents a process 800 detailing the modified robot operation of some embodiments for coordinating the movement of a robot with synchronization primitives. The process 800 commences with the robot receiving (at 810) instructions to move to a destination. The robot determines (at 820) its current location and plots a path to the destination. The robot current position can be determined by scanning one or more markers that are closest to the robot.

Before the robot can begin moving, the robot identifies (at 830) the synchronization primitives for space resources established by other robots. In a centralized model, the robot may receive the synchronization primitives from a coordinator that tracks synchronization primitives established by all robots. In a distributed model, the robot may receive synchronization primitives established by other robots based on peer-to-peer messaging exchanged between the robots. Based on the synchronization primitives for different space resources established by the other robots, the robot checks (at 840) if the space into which it intends to move is reserved by another robot.

When another robot has the space reserved, the robot waits (at 845) until the synchronization primitive for that space resource is removed (at 850). In some embodiments, the robot is permitted to perform an evasive maneuver to travel around another robot's space resource synchronization primitive. The evasive maneuver may include temporarily entering a third lane to bypass the reserved region of space.

When another robot has not reserved the space, the robot establishes (at 855) its own synchronization primitive to reserve the space before moving (at 860) into the space. The robot also removes (at 865) any synchronization primitives it had previously established to reserve space it has moved past or through. In some embodiments, the synchronization primitives are set with expiration times so that the robot does not have to explicitly remove the synchronization primitives, the robot can simply let a synchronization primitive expire without reestablishing the synchronization primitive. In some embodiments, the establishment step at 855 involves the robot establishing synchronization primitives to reserve some amount of space behind the robot and to its side. These additional space resource reservations prevent other robots from blocking in the robot in case the robot needs to reverse or change course. Establishing the synchronization primitives involves updating the other robots as to the existence and position of the robot's locks. As the robot moves, the robot scans (at 870) the markers along its path and receives (at 875) updates regarding the position of space resource synchronization primitives of the other robots operating in the same space. The robot scans the markers to stay within the correct lane. Information decoded from scanning the markers can also direct the robot's movement to the intended destination including notifying the robot when it should turn, adjust its directional movement, or stop when the robot has reached the destination.

The robot continues in this manner until the robot arrives (at 880) at the destination location. If the robot has not yet reached its intended destination, the robot reverts back to

Figure 9:
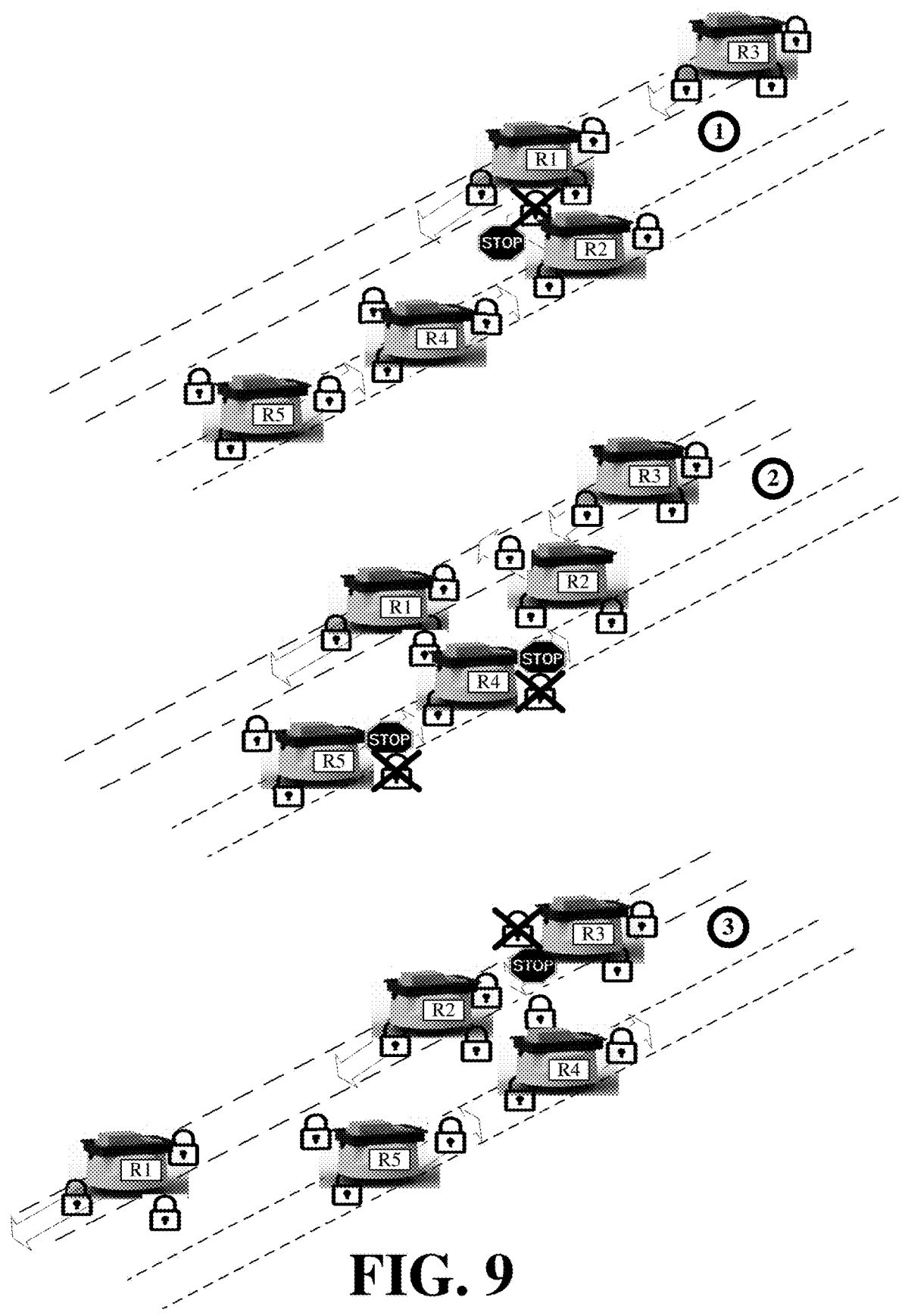
FIG. 9 presents robot movements at different times to illustrate the robots' usage of the lanes and the space resource synchronization primitives to autonomously coordinate and control their movements in accordance with some embodiments.

840. Once the robot arrives at its intended destination, the process ends. The robot can then perform a set of actions at the destination before restarting process 800 and moving to another location. In some embodiments, the robot establishes synchronization primitives for different resources needed to perform the set of actions at the destination. Some actions an order fulfillment robot takes upon reaching a destination include retrieving an item for transport or depositing a transported item. FIG. 9 presents robot movements at different times to illustrate the robots' usage of the lanes and the space resource synchronization primitives to autonomously coordinate and control their movements in accordance with some embodiments.

In these figures, each synchronization primitive represents a portion of reserved space that allows a reserving robot access to the space and prevents other robots from entering the space. The reserved space includes portions of the lanes in which the robots move, but can include other space in which the robots can enter when performing actions outside of the lanes.

The amount of space represented by a synchronization primitive is configurable. Synchronization primitives can be defined using any units of measure. In one embodiment, a synchronization primitive reserves an amount of space needed for a robot to come to a stop. In another embodiment, a synchronization primitive reserves 5 feet of space around the robot.

In some embodiments, a synchronization primitive is defined by a set of coordinates or by one or more of the markers or fiducials adjacent to the space. Other identifiers and beaconing can also be used. For example, radio-frequency (RF) tags can be placed along the lanes with each tag having a different identifier. Robots establish the synchronization primitives by reserving one or more of the RF tag identifiers.

The above examples simplify resource reservation by focusing on the single resource of three-dimensional space as a robot goes about performing a task. However, task completion will normally require establishing several different synchronization primitives to reserve different resources associated with completing the task.

Figure 10:
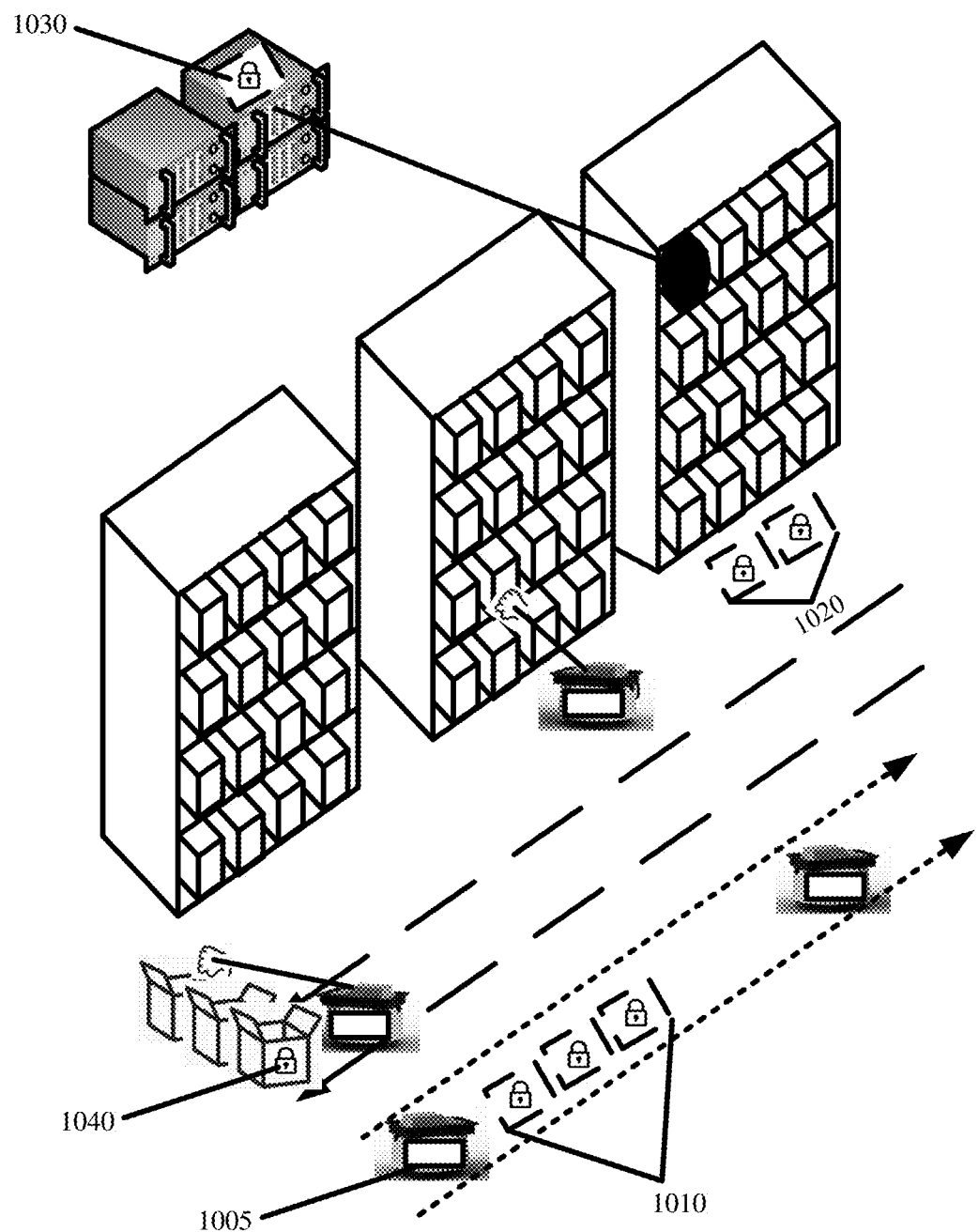
FIG. 10 conceptually illustrates a robot reserving multiple resources in performance of a task.

FIG. 10 conceptually illustrates a robot 1005 reserving multiple resources in performance of a task. The task involves the robot 1005 fulfilling a customer order by retrieving an ordered item from a storage shelf. To complete this task, the robot 1005 reserves four different sets of resources.

The robot 1005 establishes a first set of synchronization primitives 1010 to reserve space into which the robot immediately moves in order to head towards the storage shelf. The robot 1005 establishes a second set of synchronization primitives 1020 to reserve space near the storage shelf. This ensures that the robot 1005 does not travel to the storage shelf simply to wait for another robot to release access to the storage shelf. The robot 1005 establishes a third set of synchronization primitives 1030 to reserve computational resources from a remote computing cluster, wherein the robot 1005 relies on the computational resources to process robot sensor information and identify the correct item from other items on the storage shelf. The robot 1005 establishes a fourth set of synchronization primitives 1040 to package the item for delivery to the customer.

Some space in between the space reserved through first and second sets of synchronization primitives 1010 and 1020 may remain unreserved until the robot 1005 nears the unreserved space. This allows other robots access to those resources and stops robots from reserving a large amount of resources prior to needing access to those resources.

To further optimize resource availability while still guaranteeing robots access to the resources, some embodiments allow robots to queue synchronization primitives. Queued synchronization primitives are established with a time. The time designates when the resource reservation is to occur. This allows robots to schedule or reserve resources in advance without reserving the resources until they are needed by the robots.

Figure 11:
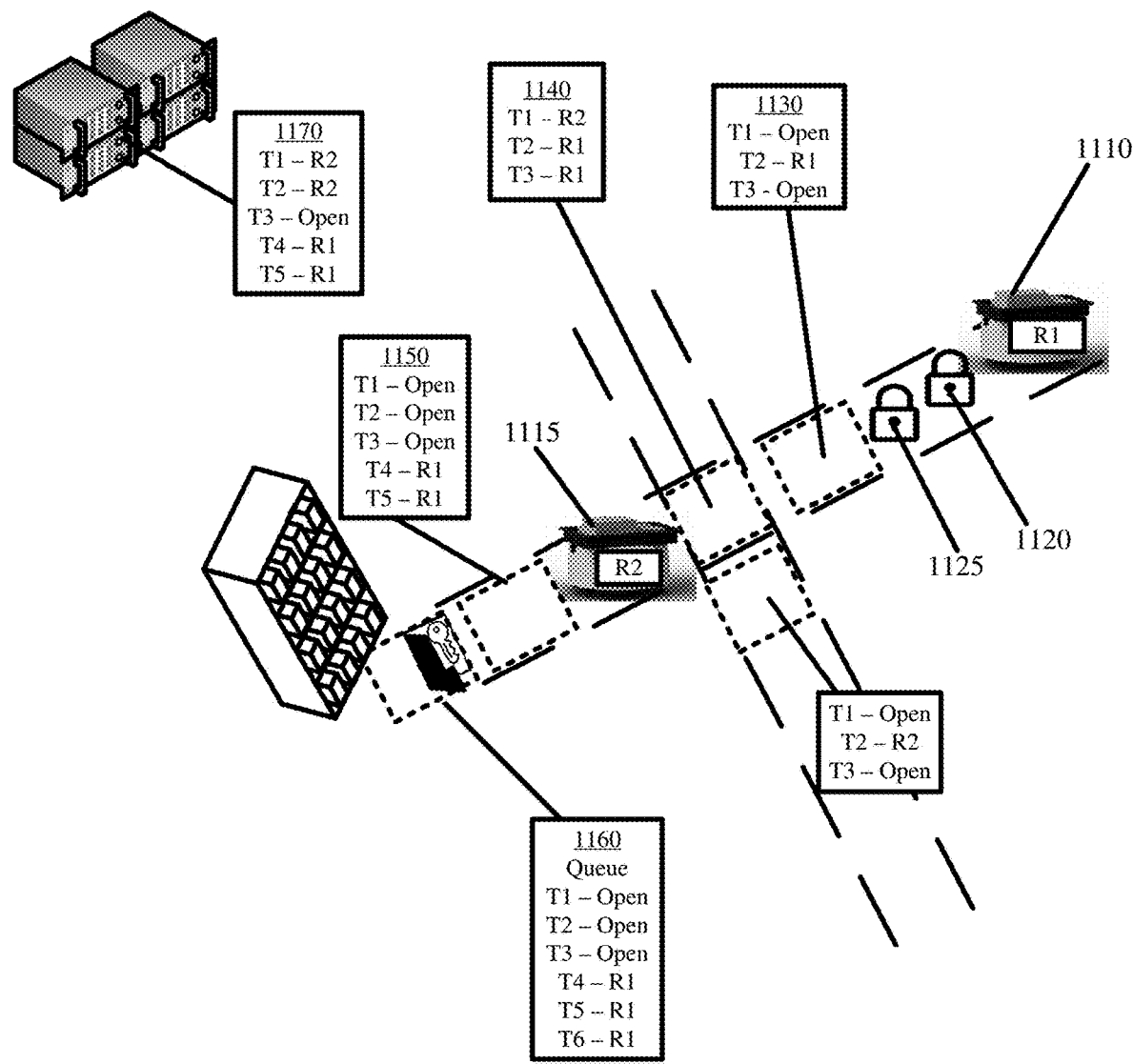
FIG. 11 illustrates synchronization primitive queuing in accordance with some embodiments.

FIG. 11 illustrates synchronization primitive queuing in accordance with some embodiments. The figure illustrates a first robot 1110 and a second robot 1115 establishing different synchronization primitives for immediate and future reservation of different resources needed to complete tasks assigned to robots 1110 and 1115.

The first robot 1110 establishes synchronization primitives 1120 and 1125 to reserve space immediately before the first robot 1110 while en route to a destination. The first robot 1110 also queues synchronization primitives for reserving space resources further along the path to the destination based on the first robot 1110 expected time of arrival at those spaces. The figure illustrates queues 1130, 1140, and 1150 for the different resources the first robot 1110 reserves for future use. The queues 1130, 1140, and 1150 illustrates other robots establishing earlier synchronization primitives for some of the same resources.

The figure also illustrates the first robot 1110 queuing synchronization primitives for access at a security door 1160. The first robot 1110 may require authorization prior to accessing a restricted area secured by the security door 1160. The queuing allows the authorization to occur prior to the first robot's 1110 arrival at the security door 1160, but not so early that the authorization expires.

The figure also illustrates future reservation of part of a remote computing cluster 1170. The queued synchronization primitive for accessing the remote computing cluster 1170 may provide the first robot 1110 with additional processing power to perform processing intensive tasks (e.g., object recognition) once the first robot 1110 arrives at its intended destination. The queuing guarantees that the first robot 1110 can complete its task without waiting for access to needed resources, but without unnecessarily reserving the resources when they are not needed.

Each robot includes a wireless transceiver or radio to directly or indirectly notify other robots of the synchronization primitives established by that robot. Each robot further includes a wireless transceiver or radio to receive the synchronization primitives that other robots have established.

In some embodiments, indirect conveyance involves performing synchronization primitive establishment and resource reservation in a centralized manner. Some such embodiments introduce a coordinator. The robots send synchronization primitive establishment requests for the resources to the coordinator. The coordinator centrally manages the reservation of the resources amongst the set of robots by keeping track of established synchronization primitives and queued synchronization primitives. In other words, the robots must reserve a resource from the coordinator before they can access the resource.

The coordinator can be a server formed by one or more machines that wirelessly communicate with the robots. The communications between the coordinator and the robots involves establishing synchronization primitives for different resources, wherein the establishment involves a robot sending a synchronization primitive establishment request for a particular resource to the coordinator and the coordinator responding with either confirmation or rejection. In some embodiments, the synchronization primitive request includes a first identifier identifying the robot submitting the request and a second identifier identifying the resource the robot wants to reserve.

When the requested resource is available at or for the time specified in the robot's request, the coordinator reserves the requested resource at or for the time specified. The coordinator then sends confirmation to the robots. The confirmation instructs the robot that its synchronization primitive was successfully established and the robot has access to the particular resource at or for the time specified in the synchronization primitive establishment request. The coordinator may also set an expiration time for the robot's synchronization primitive. The expiration time may be commensurate with the duration requested by the robot if available or may be less or more depending on access requested by other robots for the same resource.

When the coordinator finds the requested resource as having been reserved by another robot at the requested time, the coordinator rejects the robot's synchronization primitive establishment request. As part of the rejection notification, the coordinator may send the expiration time for the current established synchronization primitive so that the requesting robot can request the resource at that time and/or alter performance of its task list rather than wait idly for the particular resource to be freed.

In addition to the synchronization primitive and resource management, the coordinator can assign tasks for the different robots to perform. This involves instructing the robots on the actions they are to take. In some embodiments, the coordinator optimizes the task assignment prior to assigning the tasks to different robots for execution.

Figure 12:
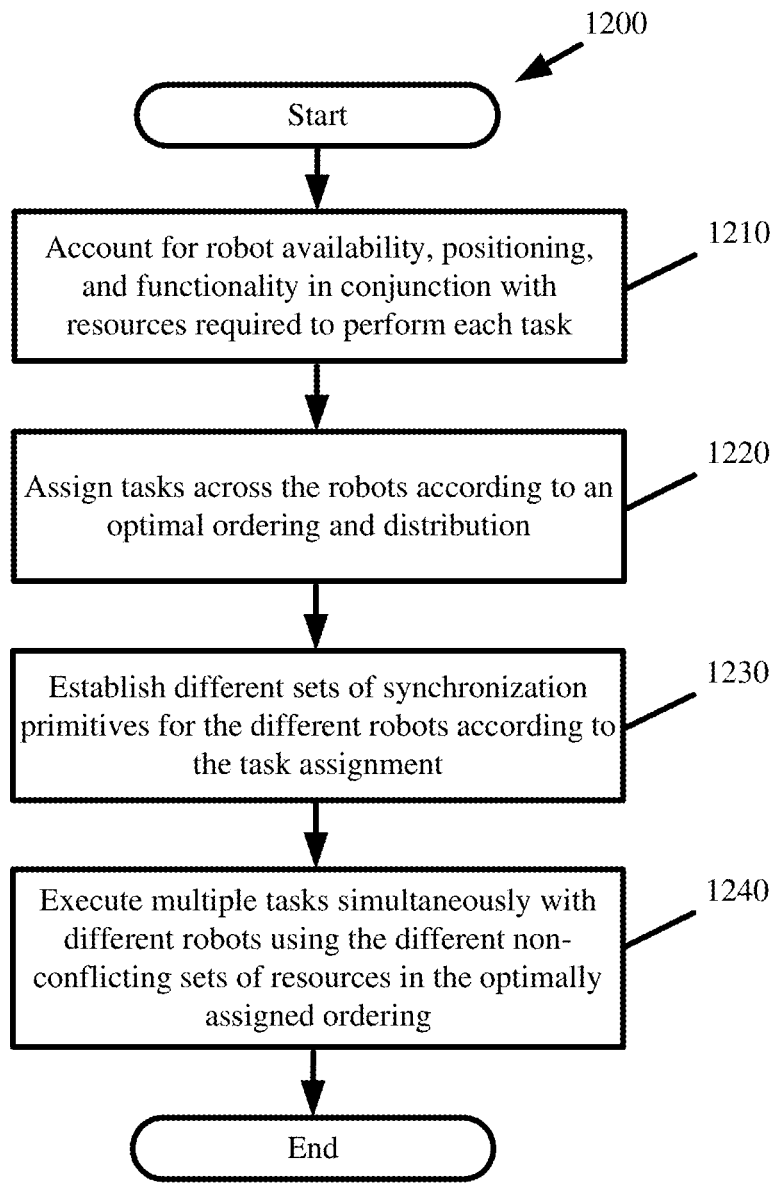
FIG. 12 presents a process for optimizing task execution by a plurality of robots using a limited and shared set of resources in accordance with some embodiments.

FIG. 12 presents a process 1200 for optimizing task execution by a plurality of robots using a limited and shared set of resources in accordance with some embodiments. Process 1200 involves accounting (at 1210) for the number of robots, current robot positions, available resources, robot functionality or capability, complexity of the tasks, resources required for each task, and other such factors.

From the accounting, the process optimally assigns (at 1220) tasks across the robots. The optimal task assignment is the result of an optimal task ordering and distribution that maximizes the number of simultaneous tasks that can be performed by the robots while minimizing or eliminating the number conflicting resources that two or more robots require in order to simultaneously perform the different tasks.

The process then involves establishing (at 1230) different sets of synchronization primitives for the different robots according to the optimal task assignment. The synchronization primitive establishment provides each of the task assigned robots immediate non-conflicting exclusive access to different sets of resources needed to perform the assigned tasks simultaneously.

The process then concludes with the robots simultaneously executing (at 1240) multiple tasks using the different non-conflicting sets of resources in the optimally assigned ordering. The task assignment optimization nevertheless remains a suboptimal optimization.

Some robots may receive an insufficient amount of resources for a given task. Some robots may perform slower than other robots, thereby reserving resources longer than expected. Some robots may experience failures. Some robots may complete a task after one or more unsuccessful attempts.

In these and other scenarios, the robots dynamically adapt and modify operation. The synchronization primitives allow for the robots to work around any unforeseen or unexpected deviations from the optimal assignment. In particular, if one robot was to malfunction or run slow, the other robots can dynamically adjust the resources they access with the synchronization primitives so that one deviation does not necessarily impact performance of the other robots or create a chain effect in which the delay propagates to all robots that subsequently need access to the resource accessed by the delaying robot or further resources access by the delaying robot.

Figure 13:
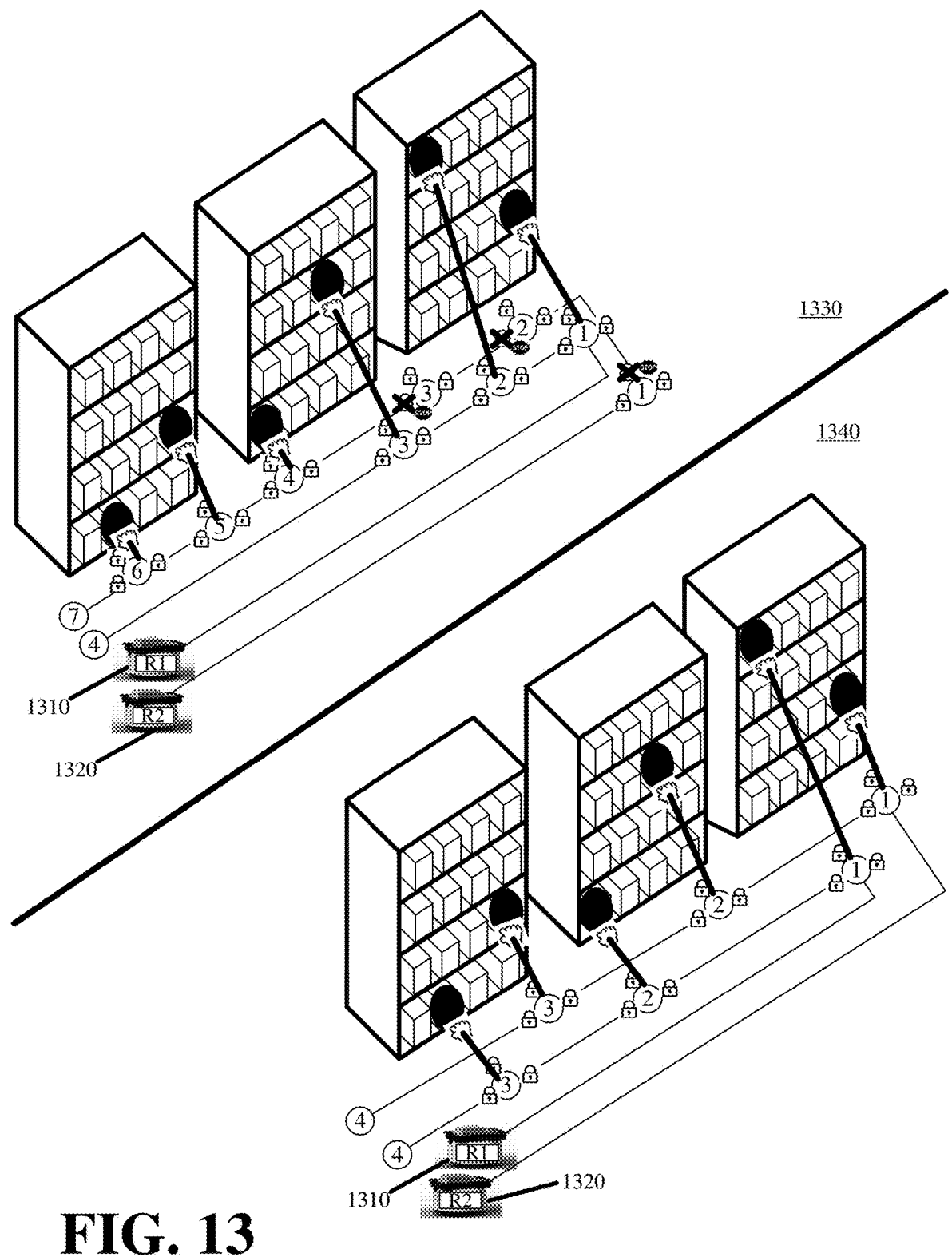
FIG. 13 conceptually illustrates optimizing the movement of multiple robots in accordance with some embodiments.

FIG. 13 conceptually illustrates optimizing the movement of multiple robots in accordance with some embodiments. The figure illustrates two robots 1310 and 1320 and a set of stopping points where the robots 1310 and 1320 are to retrieve different items. Scenario 1330 provides a suboptimal scheduling of the retrieval tasks that would cause the robots 1310 and 1320 to have to wait for one another at different stops. Scenario 1340 provides an optimal schedule in which every other stop is assigned to one of the robots 1310 and 1320. The robots 1310 and 1320 can then move to the stops and perform the tasks without waiting for one another.

The coordinator may issue rules to the robots 1310 and 1320. The rules can set speeds at which the robots travel in the different lanes or when coming upon a synchronization primitive established by another robot. For instance, rather than race to the reserved resource of another robot, stop, and wait for the synchronization primitive to be removed, a robot can reduce its speed until the synchronization primitive is removed and then resume at a faster speed.

Some embodiments perform the synchronization primitive establishment and resource reservation in a decentralized or distributed manner. In some such embodiments, the synchronization primitives are established through peer-to-peer messaging exchanged between the set of robots. From this messaging, robots can independently optimize their task list and perform assigned tasks in the most efficient manner based on the availability of different resources.

Since there is no central coordinator coordinating access to the resources, there is additional complexity involved in the peer-to-peer establishment of the synchronization primitives. In particular, the robots must form a consensus amongst themselves as to which robot is granted access to which resource at any given time.

In some embodiments, a particular robot queries the other robots when attempting to establish a synchronization primitive for reservation of a particular resource. If the other robots are in agreement that there is no conflict, they grant the particular robot access to the requested resource. The particular robot then notifies the other robots that it has established the synchronization primitive with respect to the particular resource, thereby reserving the particular resource at or for a specified time.

The peer-to-peer messaging may be secured by configuring each robot with a private key. The robot signs any messages it sends to other robots using its private key. The other robots can then use one or more public keys to identify the message originator.

Race conditions, conflicting access, or deadlocks can arise if two or more robots attempt to reserve the same resource at or near the same time or when a third party or malfunctioning robot denies other robots access to a particular resource that should otherwise be available. Accordingly, some embodiments provide secure peer-to-peer synchronization primitive establishment through resource blockchains. A blockchain is associated with each accessible resource. The resource blockchain tracks a chronology of events associated with the corresponding resource. From this event chronology, any robot can determine if another robot has established a synchronization primitive or has earlier priority to establish a synchronization primitive for accessing the resource associated with the blockchain.

In some embodiments, a robot writes to the blockchain using a private key that is only known to the robot. The robot can append the blockchain by retrieving a prior hash value and hashing the retrieved value with the robot's own private key. Other robots can use a public key to go back in the blockchain chronology and determine one or more robots with current access rights or priority rights to the resource.

FIGS. 12 and 13 provide a pre-optimization for coordinating the movement of the robots and resource usage at the outset of each robot being assigned a task to complete. However, as the number of simultaneously operating robots increases or the number of resources the robots are competing for become scarcer, there is a higher likelihood that the pre-optimized path or resources allocated to a robot at the outset of a task will have to be changed as the robot goes about completing the task because of unexpected delays, human interference, and other failover that one or more robots perform while competing their tasks.

Accordingly, some embodiments provide robots that perform real-time task optimization. With real-time task optimization, each robot continually optimizes the path and set of resources by which it completes assigned tasks based on at least the real-time availability of resources as identified with the resource reservation messaging exchanged between the robots. In so doing, the robots can continually account for the changing availability of the resources in order to quickly adapt their operation. In particular, the pre-optimization may identify a first set of resources by which a robot can complete a task at the outset of being assigned the task. As the robot begins the task and accesses a subset of the first set of resources, the real-time task optimization performed by the robot may identify changing availability of the first set of resources and a different second set of resources by which the robot can continue completion the task in less time. The changing availability is based on the resource reservation messaging exchanged between the robots and/or the coordinator, and other robots reserving or accessing resources from the first set of resources initially required by the robot for completion of the task. Similarly, at a later time while accessing a subset of the second set of resources as the robot approaches task completion, the real-time task optimization performed by the robot may again identify a change in the availability of the second set of resources. The robot once again adapts by identifying a different third set of resources with which the robot can complete the task faster than with continued access of the second set of resources.

In some embodiments, the real-time task optimization is based on dynamic real-time path determination through continual parallel path traversals that are timed and biased as a result of known reserved resources along each of the traversed paths. Using dynamic path determination, a robot is able to, at any time, select the fastest path by which to complete a task based on current and expected future states of resources along the available paths, wherein each path provides a different set of resources with which the robot can complete its task.

In preferred embodiments, the real-time task optimization and dynamic path determination is decentralized and performed by each robot as the robot goes about completing various tasks assigned to it by the coordinator. In some other embodiments, the real-time task optimization and dynamic path determination is centralized and performed by the coordinator on behalf of the robots. In these embodiments, the real-time task optimization and dynamic path determination is based on the simultaneous and continual reservation of resources for different robots based on reservation messaging generated by the robots or resource reservation conducted through the coordinator.

The real-time task optimization and dynamic path determination is supported by enhancing the resource reservation messaging. As before, the resource reservation messaging or establishment of the synchronization primitive continues to identify the resource being reserved, the reserving robot, and the time of the reservation. However, the resource reservation messaging or synchronization primitive establishment is enhanced to also identify either the operation the reserving robot is to perform when accessing a resource, or the cost or penalty that is derived from the operation the reserving robot is to perform. The cost can be calculated based on the expected amount of time the robot reserves a resource in order to complete one or more operations while accessing the resource. For instance, a space resource that is reserved by a robot in order for the robot to pass through the space without collision may be associated with a low first penalty, because of the short duration the robot reserves the space resource. If, however, the same space resource is reserved by the robot in order for the robot to change directions, a greater second penalty will be associated with the reservation because of the longer time it takes for the robot to complete a turn than simply move through a space. Similarly, if the same space resource is reserved by the robot in order to retrieve an item or object while at the space, an even greater third penalty will be associated with the reservation, wherein the third penalty is greater than either of the first or second penalties. In summary, a varying cost or penalty is assigned to each resource reservation made by a robot based on the action or operation the reserving robot performs while the resource is reserved.

Figure 14:
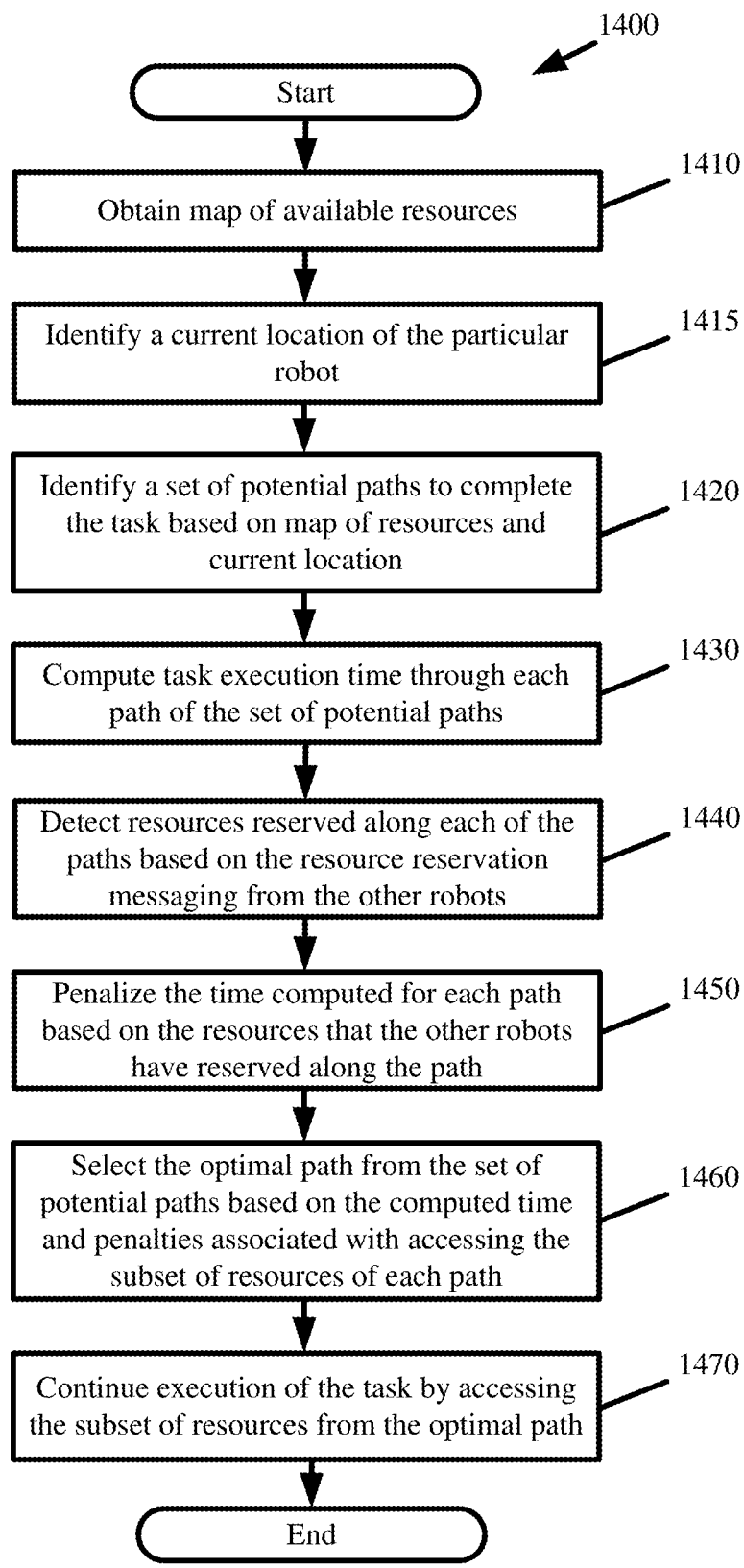
FIG. 14 presents process for a particular robot performing real-time task optimization and dynamic path determination in accordance with some embodiments.

FIG. 14 presents process 1400 for a particular robot performing real-time task optimization and dynamic path determination in accordance with some embodiments. The particular robot operates in a setting with other robots that compete for access to the same set of resources while simultaneously performing different tasks. The process 1400 occurs in conjunction with the enhanced resource reservation messaging or synchronization primitive establishment messaging being continually exchanged between the robots, and the particular robot executing a task that is newly assigned or a task that the particular robot has already partly completed. As noted above, the enhanced resource reservation messaging identifies the resources the robots reserve as well as the cost or penalty associated with the operation being performed while the resource is reserved or the operation from which the cost or penalty can be derived. Accordingly, prior to the commencement of the process 1400, the particular robot receives the resource reservation messaging broadcast by the other robots or obtains information about the reserved set of resources from the coordinator, block chains of different resources, or a central database to which the robots submit their resource reservation requests.

The process commences by obtaining (at 1410) a map identifying the resources that are available to the robots operating in the setting. The map can be centrally maintained by the coordinator. Alternatively, each robot can store the map in local memory. The resources within the map are tangible and intangible assets that the robots access in completing the tasks including physical space, computational resources, physical objects, etc.

The process identifies (at 1415) a current location of the particular robot in relation to the map. The current location can be identified from a resource currently being accessed by the particular robot or other positional means such as GPS or beaconing. For instance, the particular robot scans one or more nearby fiducials to determine its location.

From the map and current location of the particular robot, the process identifies (at 1420) a set of potential paths with which the particular robot can complete the task. Each of the potential paths is a different subset of the resources with which the particular robot can complete its task from its current state or location. This includes different physical routes that the particular robot can take to reach a destination or different steps by which the particular robot can retrieve an item.

The process computes (at 1430) the total cost for the particular robot to complete the task through each path of the set of potential paths. The total cost can be a temporal measure or some other measure (e.g., aggregate number of consumed resources, monetary costs, order fulfillment rate, etc.). The cost for each particular path can be computed based on the assumption that each resource from the subset of resources of the particular path is available, and also based on the expected time for the robot to access each resource along the particular path.

The process detects (at 1440) at the particular robot, any resources reserved along each of the paths based on the resource reservation messaging from the other robots. This includes aligning the reservation times with the times the particular robot expects to access each of the resources.

The process penalizes (at 1450) the cost computed for each path based on the resources that the other robots have reserved along the path during the time the particular robot is expecting access to those resources. As noted above, the penalty for each reserved resource of a path differs based on action or operation other robots perform on those resources when access is needed by the particular robot. Stated differently, the penalty for each reserved resource of a path differs based on the duration of the resource reservation and the time the particular robot would have to wait until the resource becomes available.

The process selects (at 1460) the optimal path from the set of potential paths based on the computed cost associated with accessing the subset of resources of each path, wherein the optimal path is the path from the set of potential paths with which the particular robot can currently complete its task with lowest total cost (e.g., in the least amount of time, consumption of the fewest number of resources, lowest financial cost, highest order fulfillment, etc.) even when accounting for resources that the other robots have reserved across the set of potential paths. The optimal path can change over time, but the selected optimal path is the most efficient path at the time process 1400 is performed. Accordingly, the particular robot continually performs process 1400 (e.g., every minute, every 30 seconds, etc.) to update the optimal path in real-time.

The process then continues (at 1470) execution of the task with the particular robot accessing the subset of resources from the optimal path. To do so, the particular robot reserves resources along the optimal path using the synchronization primitives described above before accessing them. Some of the resources may be immediately reserved, others may be reserved for some time in the future, and still other reservation requests may be entered into a queue for resources that other robots have reserved in advance.

As the particular robot accesses some of the resources from the subset of resources of the optimal path, it may perform process 1400 again after some period of time to determine if the selected optimal path remains the most efficient path or if another path is more efficient (e.g., lower overall cost) based on resource reservation messaging from the other robots issued during that period of time and the updated location of the particular robot. This repeated performance of process 1400 provides the particular robot with real-time access to the most efficient set of resources regardless of changing conditions or behavior of other robots in the same setting.

In some situations, all paths or sets of resources a robot needs to complete a task are penalized in excess of a congestion threshold. In such situations, rather than add to the congestion, the robot may take itself out of operation or the congested pathways. Adding to the congestion would simply degrade performance of all robots attempting to access the same set of resources. Alternatively, the robot could switch tasks and select a different task that can be completed by accessing at least one set of resources that is not penalized in excess of the congestion threshold.

Figure 15:
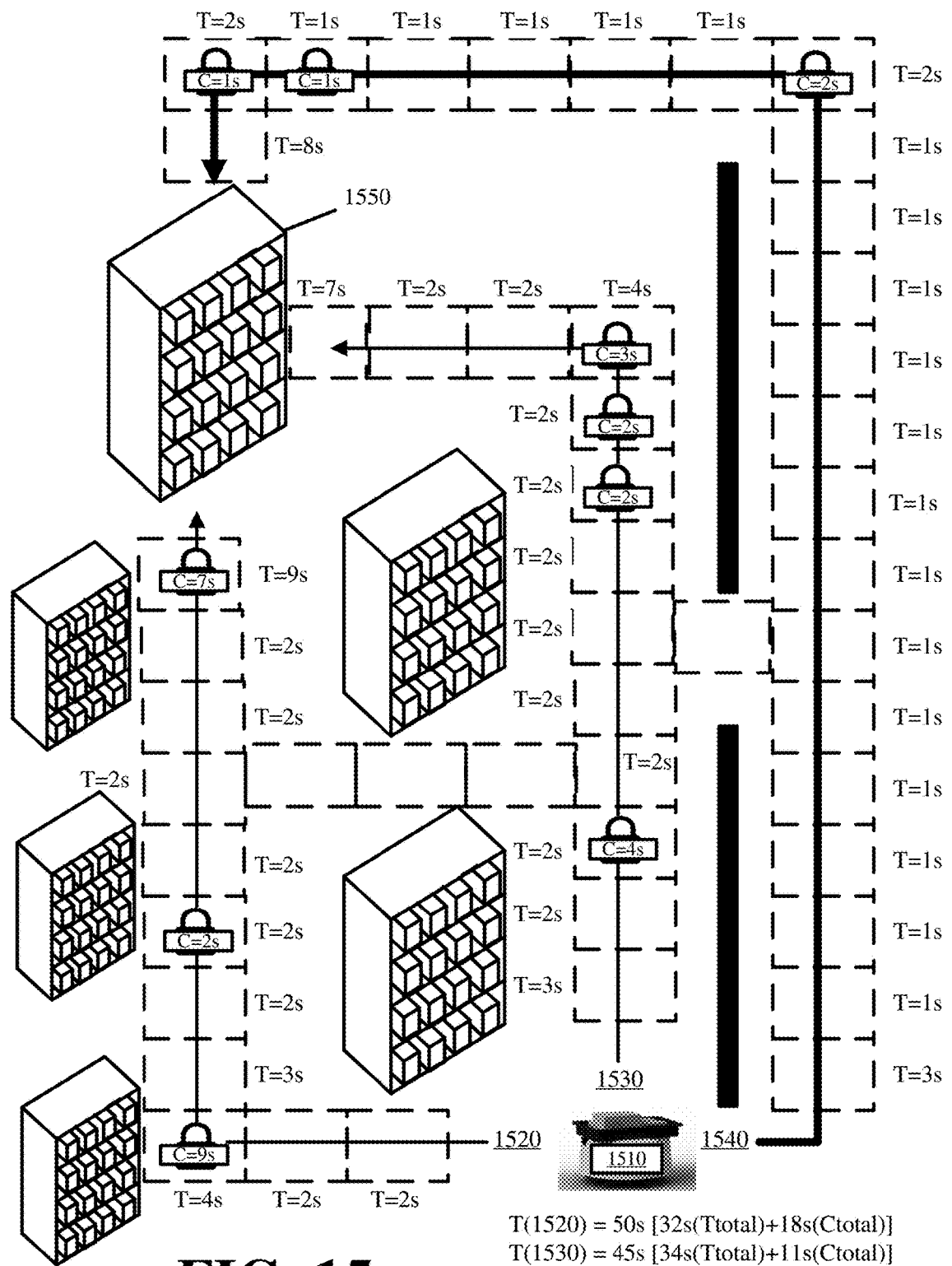
FIG. 15 conceptually illustrates the real-time task optimization and dynamic path determination performed by a particular robot in accordance with some embodiments.

FIG. 15 conceptually illustrates the real-time task optimization and dynamic path determination performed by a particular robot 1510 in accordance with some embodiments. The figure illustrates different paths 1520, 1530, and 1540 by which the particular robot 1510 can reach a destination and complete a task, wherein each of the paths 1520, 1530, and 1540 is a different physical route to the destination 1550. The different resources of the different routes, including physical space, are identified by the dotted rectangles in the figure. The expected time for the particular robot 1510 to access each resource is also illustrated with reference markers "T=", and the costs associated with reservations made by other robots on various resources at the time the particular robot 1510 is to access those resources are illustrated with reference markers "C=".

As shown, the shortest path 1520 (e.g., fewest number of consumed resources to reach the destination) is not the most optimal route because it is the most heavily congested and penalized path. In other words, other robots operating along path 1520 have reserved a large number of the resources that the particular robot 1510 would access in order to reach destination 1550 and complete its task.

The next shortest path 1530 is also heavily penalized based on resources about path 1530 being reserved by other robots. Although none of the paths 1520, 1530, and 1540 have all the resources of the corresponding path available, the longest path 1530 (e.g., greatest number of consumed resources to reach the destination) is the most optimal path because the particular robot 1510 is allowed to move faster through that path and it is also the least penalized and congested path. Accordingly, the particular robot 1510 selects the third path 1540 as the optimal path with which to complete reach destination 1550 and complete its task.

A robot or the coordinator can also use the real-time task optimization and dynamic path determination in order to select which of multiple assigned tasks the robot is to complete first. In this case, the robot has several different tasks to complete. The robot or coordinator identifies the expected cost to complete each task based on resources reserved in advance by other robots. The robot or coordinator can then select a first task for the robot to complete based on completion of the first task having the lowest overall cost. After the robot completes the first task, the robot or coordinator repeats the optimal task selection for the remaining tasks.

Additionally or alternatively, the robot or coordinator may produce different orderings for a set of pending tasks assigned to the robot. In this case, the cost for completing each task of the set of pending tasks in each particular ordering is calculated. For instance, the robot may compute a first overall cost for accessing a first set of resources to complete a first task during a first time and a second set of resources to complete a second task during a second time. The robot also computes a second overall cost for accessing the second set of resources to complete the second task first during the first time and the first set of resources to complete the first task second during the second time. The robot selects the first ordering of the first task before the second task when the first overall cost is less than the second overall cost, and selects the second ordering of the second task before the first task when the second overall cost is less than the first overall cost. The overall costs for the different task orderings are based on the costs associated with the robot accessing each resource of each task, and the costs associated with the accessed resources being reserved by others during the different times at which the robot accesses those resources through each of the different task orderings.

As the time horizon over which the robots access different resources in the future increases, it becomes more difficult to have an accurate accounting of the resource reservation costs. For instance, a particular robot can accurately determine if a particular resource will be available in one second based on the resource reservation messaging that is exchanged between the robot. However, the availability of the same particular resource five minutes in the future may be less certain as the robots go about executing their tasks. For instance, the particular resource may initially appear to be available five minutes in the future, but a failure by one robot or a change in operation by another robot at some point before the particular robot accesses the particular resource, may cause the particular resource to be unavailable.

To better account for resource availability in the future, some embodiments introduce probability-based costs. The probability-based cost is based on a probability that a particular resource will be available a specific time in the future, whether or not the particular resource has been reserved or is actually in use at the specific time in the future by another. Accordingly, the probability-based cost is another cost with which the robots and/or the coordinator optimize task selection, completion, and/or ordering, and the reservation of resources for those tasks. In particular, the probability-based cost is another cost for determining whether a robot should access a particular resource or an alternative resource as part of completing a task, or whether the robot should change when it accesses the particular resource.

The probability-based cost can be a separate cost than the costs derived from one or more operations another robot is to perform while accessing a reserved resource. For instance, the probability-based cost is a separate cost than the cost associated with a robot accessing each resource along a given path and the penalties associated with other robots having reserved one or more of the resources along the given path at the time those resources are to be accessed by the robot. The probability-based cost can also be used as a modifier of the costs derived from one or more operations another robot is to perform while accessing a reserved resource.

The probability-based cost can account for the past usage of a particular resource. For instance, if the particular resource has a history of being reserved forty seconds of every minute during a specific time of day (e.g., 1-2 PM), the robots or the coordinator can attribute a high probability-based cost to accessing the particular resource during that specific time of day. The probability-based cost can be decreased if the particular resource has not yet been reserved during that specific time of day by another (e.g., no resource reservation messaging has been exchanged identifying reservation of the particular resource at that specific time of day), and can be increased if the particular resource has already been reserved by one or more other robots during that specific time of day.

The probability-based cost can additionally or alternatively account for expected future usage of a particular resource. Although the expected future usage can be based in part on the past usage, the expected future usage can also be based on other factors or heuristics. For instance, a frequently retrieved item may be moved from a first location to a second location. In response to moving the item, the probability-based cost with accessing resources at the first location may decrease (because the popular item is no longer there), whereas the probability-based cost with accessing resources at the second location may increase.

Another factor affecting the probability-based cost for expected future usage is the expected time of access and the expected location of other robots at the expected time of access. For example, the coordinator or a particular robot may identify that several other robots are assigned tasks and/or will be performing those tasks in the vicinity of a particular resource at the expected time of access by the particular robot. In this example, the probability-based cost for the particular resource is increased, because there is a higher likelihood of one of the other robots accessing the particular resource as part of completing the other tasks in the vicinity of the particular resource at the expected time of access. Congestion, failures, or unexpected operational changes by the other robots are other factors that can increase the probability-based cost for accessing the particular resource at the expected time when several other robots are in vicinity of the particular resource at the expected time. If no or a few robots are expected to perform tasks in the vicinity of the particular resource at the expected time of access, then the probability-based cost can be zero or decreased to a lower cost.

The probability-based cost can additionally or alternatively account for other factors as well. This can include accounting for failure rates. For instance, the probability-based cost for accessing a particular resource at a specific time in the future increases if a particular robot experiences a high rate of failures relative to other robots. This can also include account for task rates. For instance, the probability-based cost for accessing a particular resource at a specific time in the future increases if the number of tasks to complete is expected to increase at the specific time in the future, with the increased cost accounting for the increased congestion and additional delays that a robot may experience in order to access the particular resource.

Figure 16:
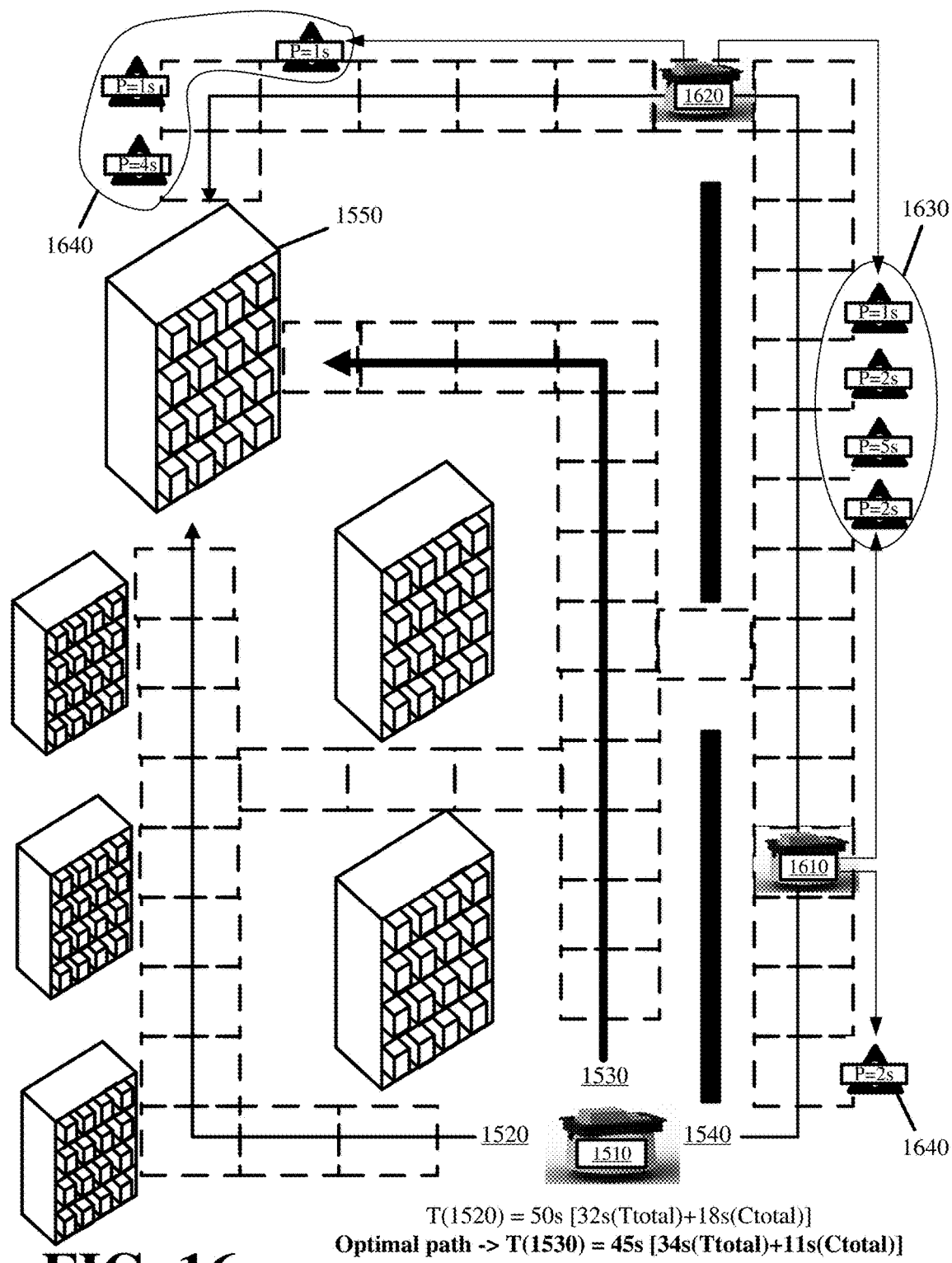
FIG. 16 conceptually illustrates accounting for the probability-based cost as part of the real-time task optimization and dynamic path determination of FIG. 15.

In summary, the probability-based cost is derived from one or more of tracking the current locations of the other robots in a distribution site, the tasks assigned to the other robots, the resources with which the robots complete different tasks, the past history of completed tasks, the expected future usage, and other factors. FIG. 16 conceptually illustrates accounting for the probability-based cost as part of the real-time task optimization and dynamic path determination of FIG. 15.

FIG. 16 illustrates robots 1610 and 1620 that operate in the same site as robot 1510, and the probability-based costs that are derived from the probability that the robots 1610 and 1620 will access and/or perform one or more operations on the same resources at the same time as robot 1510. In this figure, the probability-based costs are defined in terms of time and are illustrated with reference markers "C=".

As shown, different probability-based costs may be associated with each of the robots 1610 and 1620. The different probability-based costs depend on which direction the robots 1610 and 1620 move and/or what operations each robot 1610 and 1620 performs over time. As shown, a first set of probability-based costs 1630 are associated with the robots 1610 and 1620 heading towards each other and a second set of probability-based costs 1640 are associated with the robots 1610 and 1620 heading in opposite directions. Other probability-based costs that are not shown, but that could be considered in the optimal path selection for robot 1510 can include costs for the probability that the robots 1610 and 1620 head in the same direction, costs for the probability that the robots 1610 and 1620 perform various operations about each of the available movement directions, costs for the probability that the robots 1610 and 1620 experience a failure or some interruption, and costs for the probability of other outcomes.

The total cost computation for the resources of path 1540 is modified to account for the first set of probability-based costs 1630 and the second set of probability-based costs 1640. In particular, the impact to the total cost computation by the first set of probability-based costs 1630 is adjusted according to the probability or likelihood that the robots 1610 and 1620 act in that first corresponding manner, and the impact to the total cost computation by the second set of probability-based costs 1640 is similarly adjusted according to the probability or likelihood that the robots 1610 and 1620 act in that second corresponding manner. In this figure, the first set of probability-based costs 1630 have a 75% chance of being incurred, and the second set of probability-based costs 1640 have a 25% chance of being incurred. Accordingly, the total cost computation is increased by 75% of the first set of probability-based costs 1630 and 25% of the second set of probability-based costs 1640. The probability of incurring the different probability-based costs 1630 and 1640 can be based on, for example, the locations, assigned tasks, past usage, expected future usage, and other factors associated with the other robots 1610 and 1620. Although other probability-based costs for any other sets of probable movements, actions, or outcomes of the other robots are not shown, these other probability-based costs can be similarly adjusted in the computation of the total cost computation for the resources of path 1540.

When adjusting for the probability-based costs along path 1540, the total along path 1540 exceeds the total cost along path 1530. Accordingly, in FIG. 16, robot 1510 selects path 1530 and accesses the resources along path 1530 in order to arrive at destination 1550.

The above embodiments have been described with respect to robots that move using some motive force. These include any robots with wheels, legs, propellers, or other actuators providing powered or motorized movement. Other components of the robots include a power source, such as a battery, to provide power for the actuators (e.g., motors or engines) that move the wheels, legs, propellers, or other means of movement. The components can further include wireless or wired network connectivity (e.g., a transceiver or radio), a camera or scanner to image the markers, and a processor to decode the markers, establish the locks, control movements of the robots, and communicate with the coordinator or other robots.

U.S. Pat. No. 9,120,622 describes a transitory order fulfillment robot that can be adapted to implement the embodiments presented herein. The contents of U.S. Pat. No. 9,120,622 are incorporated herein by reference. The robots described herein can also include autonomous or self-driving vehicles, aerial vehicles, and any other autonomous machine that moves in the physical world and/or performs tasks on physical objects. For instance, autonomous vehicles can use the synchronization primitives in order to reserve physical space about a road in order to arrive at a destination without colliding with other vehicles and without becoming gridlocked. With respect to aerial robots, the lanes can be defined at multiple planes. For example, a first set of markers can be placed at a first height and a second set of markers can be placed at a different second height. The aerial robots can then create lanes at either height based on keeping a set distance from the first set of markers when moving at the first height and keeping a set distance from the second set of markers when moving at the second height. The aerial robots will continue to use the locks, although the locks are defined with an additional parameter to specify a plane.

We claim:

1. A robot comprising:

a wireless transceiver receiving a plurality of messages originating from a plurality of other robots operating in a common site, each message of the plurality of messages identifying at least one shared resource of a plurality of shared resources that is reserved by a different robot of the plurality of other robots and (i) at least one operation from a set of operations the different robot executes when accessing the at least one shared resource or (ii) a cost associated with the at least one operation, wherein each operation of the set of operations is associated with a different cost;

a memory storing a mapping of the common site, said mapping comprising at least first and second routes to a destination of a task from a current location of the robot;

a processor calculating (i) a first cost based on a first set of operations the robot executes when accessing a first set of the plurality of shared resources along the first route, and a first set of additional costs resulting from unavailability of a first subset of the first set of resources due to previous reservations of the first subset of resources by a first set of the plurality of other robots and the at least one operation or the cost associated with the at least one operation that the first set of robots execute when accessing each resource of the first subset of resources, and (ii) a second cost based on a second set of operations the robot executes when accessing a different second set of the plurality of shared resources along the second route, and a second set of additional costs resulting from unavailability of a second subset of the second set of resources due to previous reservations of the second subset of resources by a second set of the plurality of other robots and the at least one operation or the cost associated with the at least one operation that the second set of robots execute when accessing each resource of the second subset of resources; and one or more actuators moving the robot from the current location to the destination in response to said calculating by the processor, wherein said moving comprises (i) accessing the first set of resources along the first path with the robot in response to the first cost and the first set of additional costs being less than the second cost and the second set of additional costs, and (ii) accessing the second set of resources along the second path with the robot in response to the second cost and the second set of additional costs being less than the first cost and the first set of additional costs.

2. The robot of claim 1, wherein the transceiver sends first messaging to the plurality of other robots in response to the first cost and the first set of additional costs being less than the second cost and the second set of additional costs, and second messaging to the plurality of other robots in response to the second cost and the second set of additional costs being less than the first cost and the first set of additional costs, wherein the first messaging reserves at least a subset of the first set of resources for exclusive access by the robot, and wherein the second messaging reserves at least a subset of the second set of resources for exclusive access by the robot.

3. The robot of claim 1, wherein the processor further calculates the first set of additional costs based a first set of probabilities the first subset of the first set of shared resources are in use by other robots at an expected time of access by the robot, and wherein the processor further calculates the second set of additional costs based on a second set of probabilities the second subset of the second set of shared resources are in use by other robots at an expected time of access by the robot.

4. A method comprising:
exchanging a plurality of resource reservation messages between a plurality of autonomous machines operating in a common environment, each message of the plurality of resource reservation messages identifying at least one resource from a plurality of available resources in the common environment that is reserved for access by a different autonomous machine from the plurality of autonomous machines, and (i) at least one operation from a set of operations the different autonomous machine executes when accessing the at least one resource or (ii) a cost associated with the at least one operation, wherein each operation of the set of operations is associated with a different cost;
assigning a task to a particular autonomous machine of the plurality of autonomous machines;
computing at least (i) a first cost based on an expected time with which the particular autonomous machine accesses each of a first set of the plurality of available resources in completion of the task, and (ii) a different second cost based on an expected time with which the particular autonomous machine accesses each of a different second set of the plurality of available resources in completion of the task;
increasing (i) the first cost based on a first set of the plurality of resource reservation messages that identify resources in the first set of resources reserved by a first set of the plurality of autonomous machines, and the at least one operation or the cost associated with the at least one operation that the first set of autonomous machines execute when accessing each resource of the first set of resources, and (ii) the second cost based on a second set of the plurality of resource reservation messages that identify resources in the second set of resources reserved by a second set of the plurality of autonomous machines, and the at least one operation or the cost associated with the at least one operation that the second set of autonomous machines execute when accessing each resource of the second set of resources; and
operating the particular autonomous machine in completion of said task with the particular autonomous machine (i) accessing the first set of resources in response to the first cost being less than the second cost, and (ii) accessing the second set of resources in response to the second cost being less than the first cost.

5. The method of claim 4 further comprising mapping different sets of the plurality of resources with which the particular autonomous machine can complete the task, wherein the different sets of resources comprise the first set of resources and the second set of resources.

6. The method of claim 4 further comprising receiving an additional third set of resource reservation messages during said operating, identifying an updated location of the particular autonomous machine, and computing at least (i) a third cost based on expected times of the particular autonomous machine accessing each remaining resource of the first set of resources in completing the task from the updated location, and (ii) a fourth cost based on expected times of the particular autonomous machine accessing each of a different third set of the plurality of available resources in completing the task from the updated location.

7. The method of claim 6 further comprising increasing the third cost based on the third set of resource reservation messages identifying resources in the first set of resources that the particular autonomous machine has yet to access in arriving at the updated location and that are reserved by a third set of the plurality of autonomous machines, and (ii) the fourth cost based on the third set of resource reservation messages identifying resources in the third set of resources that the particular autonomous machine has yet to access in arriving at the updated location and that are reserved by a fourth set of the plurality of autonomous machines.

8. The method of claim 7 further comprising changing operation of the particular autonomous machine during said operating based on the particular autonomous machine accessing the third set of resources instead of the first set of resources in response to the fourth cost resulting from said increasing the fourth cost being less than the third cost resulting from said increasing the third cost.

9. The method of claim 4 further comprising sending a first set of resource reservation messages from the particular autonomous machine to other autonomous machines of the plurality of autonomous machines in response to the first cost being less than the second cost, and a different second set of resource reservation messages from the particular autonomous machine to the other autonomous machines in response to the second cost being less than the first cost, wherein the first set of resource reservation messages reserves at least a subset of the first set of resources for exclusive access by the particular autonomous machine, and wherein the second set of resource reservation messages reserves at least a subset of the second set of resources for exclusive access by the particular autonomous machine.

10. The method of claim 4, wherein said operating comprises moving the particular autonomous machine through a first route in the common environment while accessing the first set of resources, and moving the particular autonomous machine through a different second route in the common environment while accessing the second set of resources.

11. The method of claim 4, wherein said increasing comprises assigning different delays to the resources reserved by other the first set of autonomous machines of the based on different operations or actions an autonomous machine of the first set of autonomous machines performs on a reserved resource while accessing that reserved resource.

12. The method of claim 4, wherein said operating comprises switching the particular autonomous machine from accessing the first set of resources to accessing a third set of resources in response to reperforming said exchanging, computing, and increasing with the first set of resources and the third set of resources.

13. A method comprising:

identifying a first path comprising a first set of resources a particular robot accesses in arriving at a destination, wherein a first set of other robots are located within the first path at various times;

determining a first probability of the first set of other robots accessing one or more resources of the first set of resources at a same time as the particular robot;

determining a first set of penalties associated with the first set of other robots accessing the one or more resources of the first set of resources;

modifying the first set of penalties based on the first probability;

determining a first cost based on (i) the particular robot accessing each resource of the first set of resources and (ii) the first set of penalties after said modifying the first set of penalties;

identifying a different second path comprising a second set of resources the particular robot accesses in arriving at the destination, wherein a second set of other robots are located within the second path at various times;

determining a different second cost based on (i) the particular robot accessing each resource of the second set of resources and (ii) a second set of penalties associated with the second set of other robots accessing one or more resources of the second set of resources at a same time as the particular robot; and moving the robot from a current location to the destination by (i) accessing the first set of resources with the particular robot in response to the first cost being less than the second cost, and (ii) accessing the second set of resources with the particular robot in response to the second cost being less than the first cost.

14. The method of claim 13, wherein said accessing the first set of resources comprises establishing a synchronization primitive on each resource of the first set of resources prior to the particular robot accessing each resource.

15. The method of claim 14, wherein said establishing the synchronization primitive comprises associating a unique identifier of the particular robot with each resource of the first set of resources and providing the unique identifier in conjunction with each resource of the first set of resources to the first set of other robots.

16. The method of claim 13 further comprising modifying the first probability of the first set of other robots accessing the one or more resources of the first set of resources at the same time as the particular robot based on one or more of a current location of each robot of the first set of other robots, tasks assigned to each robot of the first set of other robots, past usage of the first set of resources, and expected future usage of the first set of resources.

\* \* \* \* \*